United States Patent
Yoshida et al.

(10) Patent No.: US 11,136,416 B2
(45) Date of Patent: Oct. 5, 2021

(54) RUBBER COMPOSITION

(71) Applicant: KAO CORPORATION, Tokyo (JP)

(72) Inventors: Yutaka Yoshida, Wakayama (JP);
Takuma Tsuboi, Wakayama (JP);
Shotaro Shibata, Wakayama (JP);
Yoshiaki Kumamoto, Wakayama (JP);
Motoi Konishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 132 days.

(21) Appl. No.: 15/757,784

(22) PCT Filed: Sep. 5, 2016

(86) PCT No.: PCT/JP2016/076056
§ 371 (c)(1),
(2) Date: Mar. 6, 2018

(87) PCT Pub. No.: WO2017/043453
PCT Pub. Date: Mar. 16, 2017

(65) Prior Publication Data
US 2018/0244806 A1  Aug. 30, 2018

(30) Foreign Application Priority Data

Sep. 7, 2015  (JP) .............................. JP2015-176048

(51) Int. Cl.
| | | |
|---|---|---|
| *C08B 11/193* | (2006.01) | |
| *B60C 1/00* | (2006.01) | |
| *C08B 11/08* | (2006.01) | |
| *C08L 9/02* | (2006.01) | |
| *C08L 1/28* | (2006.01) | |
| *C08J 3/00* | (2006.01) | |
| *C08J 5/06* | (2006.01) | |
| *C08L 9/06* | (2006.01) | |

(52) U.S. Cl.
CPC .............. *C08B 11/193* (2013.01); *B60C 1/00* (2013.01); *C08B 11/08* (2013.01); *C08J 3/005* (2013.01); *C08J 5/06* (2013.01); *C08L 1/284* (2013.01); *C08L 9/02* (2013.01); *C08L 9/06* (2013.01); *C08J 2309/06* (2013.01); *C08J 2401/26* (2013.01); *C08L 2205/16* (2013.01)

(58) Field of Classification Search
CPC ........ C08B 11/193; C08B 11/08; C08L 1/284; C08L 9/02; C08L 9/06; C08L 2205/16; C08J 5/06; C08J 3/005; C08J 2401/26; C08J 2309/06; B60C 1/00
See application file for complete search history.

(56) References Cited

U.S. PATENT DOCUMENTS

| | | | | |
|---|---|---|---|---|
| 6,703,497 B1* | 3/2004 | Ladouce | ................. | C08B 11/00 536/124 |
| 2005/0203291 A1* | 9/2005 | Svenson | ................. | C07H 3/02 536/124 |
| 2010/0266896 A1* | 10/2010 | Stromme | ............... | H01G 11/56 429/209 |
| 2012/0328877 A1 | 12/2012 | Shiramizu et al. | | |

FOREIGN PATENT DOCUMENTS

| | | | | |
|---|---|---|---|---|
| FR | 2800378 A1 | 5/2001 | | |
| JP | 2002-524618 A | 8/2002 | | |
| JP | 2009-19200 A | 1/2009 | | |
| JP | 2011-184816 A | 9/2011 | | |
| JP | 2013-129767 A | 7/2013 | | |
| JP | 2013-204010 A | 10/2013 | | |
| JP | 2014-218598 A | 11/2014 | | |
| JP | 2014218598 A * | 11/2014 | ........... | C08B 15/016 |
| JP | 2017-53077 A | 3/2017 | | |

OTHER PUBLICATIONS

English language translation of JP 2014-218598, pp. 1-32, Oct. 5, 2019.*
Tribology of Natural Fiber Polymer Composites, Woodhead Publishing Seires in Composites Science and Engineering, edited by Chand et al, Chapter 1—Natural fibers and their composites pp. 1-58, Woodhead Publishing Limited, 2008.*
English language translation of JP 2014-218598A, pp. 1-33, Jun. 22, 2021.*
Extended European Search Report for European Application No. 16844314.1, dated Mar. 29, 2019.
"Polymer Material Molding Process", published May 31, 2000, pp. 89-93 (6 pages total).
Chinese Office Action and Search Report dated Oct. 30, 2019, for Chinese Application No. 201680051547.1.
International Search Report (form PCT/ISA/210), dated Nov. 1, 2016, for International Application No. PCT/JP2016/076056 , with an English translation.

* cited by examiner

*Primary Examiner* — Alexander C Kollias
(74) *Attorney, Agent, or Firm* — Birch, Stewart, Kolasch & Birch, LLP

(57) ABSTRACT

A rubber composition containing a rubber and modified cellulose fibers, wherein one or more substituents selected from substituents represented by the following general formulas (1) and (2): —$CH_2$—$CH(OH)$—$R_1$ (1), —$CH_2$—$CH(OH)$—$CH_2$—$(OA)_n$—$O$—$R_1$ (2), wherein each $R_1$ in the general formulas (1) and (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms are bonded to cellulose fibers via an ether bond, wherein the modified cellulose fibers have a cellulose I crystal structure. The rubber composition of the present invention can be suitably used for machine tool parts, household electric appliance parts, automobile parts, and the like.

19 Claims, No Drawings

RUBBER COMPOSITION

FIELD OF THE INVENTION

The present invention relates to a rubber composition. More specifically, the present invention relates to a rubber composition which can be suitably used in machine tool parts, household electric appliance parts, automobile parts, and the like, a method for producing the rubber composition, and a rubber part for industrial use and a tire, containing the rubber composition.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in large amounts in nature have been remarked.

For example, Patent Publication 1 discloses cellulose nanofibers having an average degree of polymerization of 600 or more and 30,000 or less, an aspect ratio of from 20 to 10,000, and an average diameter of from 1 to 800 nm, as cellulose nanofibers having excellent reinforcing effects, characterized in that the cellulose nanofibers have crystal peaks of Iβ form in X-ray diffraction patterns. The resin composition containing the cellulose nanofibers shows excellent moldability and a coefficient of linear thermal expansion.

Patent Publication 2 discloses that pulps containing a lignin are subjected to a mechanical defibration treatment to provide microfibrillated vegetable fibers with a structure coated with hemicellulose and lignin in that order, thereby making them easier to handle in an aqueous system, and that the fiber-reinforced resin blended with the vegetable fibers has a decomposition temperature higher than a conventional microfibrillated cellulose, so that they are excellent in thermal stability.

Patent Publication 3 discloses cellulose microfibrils having a modified surface, characterized in that a hydroxyl functional group existing on a surface of the microfibrils is etherified with at least one of an organic compound capable of reacting with the hydroxyl functional group, wherein the degree of substitution of surface (DSS) during etherification is at least 0.05. The publication describes that an elastomeric composition containing the microfibrils shows excellent mechanical strength.

Patent Publication 4 discloses a composite material containing cellulose microfibers of which surface is replaced with an ether group having a degree of substitution of surface (DSS) of at least 0.05.

Patent Publication 1: Japanese Patent Laid-Open No. 2011-184816
Patent Publication 2: Japanese Patent Laid-Open No. 2009-19200
Patent Publication 3: Japanese Unexamined Patent Publication No. 2002-524618
Patent Publication 4: FR2800378 Publication

SUMMARY OF THE INVENTION

The present invention relates to the following [1] to [4]:
[1] A rubber composition containing a rubber and modified cellulose fibers, wherein one or more substituents selected from substituents represented by the following general formula (1) and substituents represented by the following general formula (2)

$$—CH_2—CH(OH)—R_1 \quad (1)$$

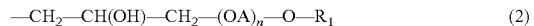

$$—CH_2—CH(OH)—CH_2—(OA)_n—O—R_1 \quad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms are bonded to cellulose fibers via an ether bond, wherein the modified cellulose fibers have a cellulose I crystal structure.
[2] A method for producing a rubber composition containing a rubber and modified cellulose fibers, including: introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, to provide modified cellulose fibers, and mixing the modified cellulose fibers obtained and the rubber.
[3] A rubber part for industrial use containing a rubber composition as defined in the above [1].
[4] A tire containing a rubber composition as defined in the above [1].

DETAILED DESCRIPTION OF THE INVENTION

Even if the rubber compositions contain the cellulose fibers of Patent Publications 1 to 4, further improvements are needed for rubber compositions which are tried to be applied to various applications.

The present invention relates to a rubber composition having excellent mechanical strength, reduced energy loss, and dimensional stability when blended with a rubber, a method for producing the rubber composition, and a rubber part for industrial use and a tire, containing the rubber composition.

The rubber composition of the present invention shows excellent mechanical strength, and exhibits some excellent effects of having excellent reduced energy loss and dimensional stability.

[Rubber Composition]

The rubber composition of the present invention is characterized in that the composition contains a rubber and specified modified cellulose fibers.

[Modified Cellulose Fibers]

The modified cellulose fibers in the present invention are characterized in that a specified substituent is bonded to a cellulose fiber surface via an ether bond. The above modified cellulose fibers may be hereinafter described as the modified cellulose fibers of the present invention. The phrase "bonded via an ether bond" as used herein means a state in which a hydroxyl group of the cellulose fiber surface is reacted with a modifying group to form an ether bond.

The reasons why the rubber composition having excellent mechanical strength, reduced energy loss, and dimensional stability is obtained when the modified cellulose fibers of the present invention are blended with a rubber are assumed to be as follows. Celluloses, in general, are aggregated by hydrogen bonding with the surface hydroxyl groups to form bundles of microfibrils, meanwhile in the modified cellulose fibers used in the present invention, the modifying group is directly ether bonded to the cellulose chain of the cellulose fiber backbone by carrying out a reaction of introducing a specified modifying group to a surface hydroxyl group, thereby forming hydrophobic cellulose fibers in which a crystal structure of the cellulose is maintained. In addition, since the introduced modifying group has an alkyl group terminal of a specified chain length, a repulsion due to steric hindrance is obtained, thereby making dispersibility in a rubber excellent. Therefore, the modified cellulose fibers used in the present invention are evenly dispersed in a rubber, and their crystal structure is stably maintained, so that the mechanical strength, reduced energy loss, and dimensional stability of the rubber composition obtained become excellent. However, these assumptions are by no means limiting the present invention.

Average Fiber Diameter

The modified cellulose fibers of the present invention have an average fiber diameter of preferably 5 µm or more, more preferably 7 µm or more, and even more preferably 10 µm or more, from the viewpoint of improvement in mechanical strength, handling property, availability, and costs. In addition, the upper limit is, but not particularly set to, preferably 100 µm or less, more preferably 70 µm or less, even more preferably 50 µm or less, even more preferably 40 or less, and even more preferably 30 µm or less, from the viewpoint of handling property and improvement in mechanical strength. Here, the average fiber diameter of the cellulose fibers as used herein can be measured in accordance with the following method.

Specific examples include, for example, a method including stirring cellulose fibers which are previously absolutely dried with a household mixer or the like in ion-exchanged water to defibrillate, and further adding ion-exchange water thereto while stirring to make an even aqueous dispersion, and analyzing a part of the aqueous dispersion obtained by "Kajaani Fiber Lab" manufactured by Metso Automation. According to the above method, the average fiber diameter can be measured in the order of micro-order. Incidentally, the detailed measurement method is as described in Examples.

In addition, the modified cellulose fibers of the present invention may have a fine average fiber diameter. For example, the cellulose fibers can be finely fibrillated by carrying out a treatment with a high-pressure homogenizer or the like in an organic solvent. The average fiber diameter of the finely fibrillated modified cellulose fibers may be, for example, from 1 to 500 nm or so, and the average fiber diameter is preferably 3 nm or more, more preferably 10 nm or more, and even more preferably 20 nm or more, from the viewpoint of improvement in heat resistance, and the average fiber diameter is preferably 300 nm or less, more preferably 200 nm or less, even more preferably 150 nm or less, and still even more preferably 120 nm or less, from the viewpoint of handling property and dimensional stability. Here, the finely fibrillated modified cellulose fibers as used herein may be hereinafter described as fine modified cellulose fibers.

In a case of having a fine average fiber diameter as mentioned above, a fiber diameter of a nano-order can be measured by observing a dispersion obtained by a finely fibrillating treatment with an optical microscope manufactured by KEYENCE, "Digital Microscope VHX-1000" at a magnification of from 300 to 1,000 folds, and calculating an average of 30 or more of fiber strands. In a case where observation with an optical microscope is difficult, a dispersion prepared by further adding a solvent to the above dispersion is dropped on mica and dried to provide an observation sample, and a measurement can be taken with an interatomic force microscope (AFM), Nanoscope III Tapping mode AFM, manufactured by Digital Instrument, using probe Point Probe (NCH) manufactured by NANO SENSORS. Generally, a minimum unit of cellulose nanofibers prepared from higher plants is packed in nearly square form having sizes of 6.times.6 molecular chains, so that the height analyzed in the image according to the AFM can be assumed to be a width of the fibers. Here, the detailed method for measurement is as described in Examples.

(Modifying Group)

The modifying group in the modified cellulose fibers of the present invention is a substituent represented by the following general formula (1) and a substituent represented by the following general formula (2):

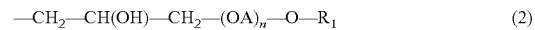

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and these substituents are introduced alone or in any combinations thereof. Here, even if the introduced modifying group were either one of the above of substituents, each of substituents, which may be the identical substituent, or a combination of two or more kinds, may be introduced.

$R_1$ in the general formula (1) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 10 or more, from the viewpoint of mechanical strength, reduced energy loss, and dimensional stability, and the number of carbon atoms is preferably 25 or less, more preferably 20 or less, even more preferably 18 or less, even more preferably 16 or less, even more preferably 12 or less, and still even more preferably 10 or less, from the viewpoint of dimensional stability, heat resistance, and improvement in reactivity. Specific examples include a propyl group, a butyl group, a pentyl group, a hexyl group, a heptyl group, an octyl group, a nonyl group, a decyl group, an undecyl group, a dodecyl group, a hexadecyl group, an octadecyl group, an icosyl group, a triacontyl group, and the like.

$R_1$ in the general formula (2) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, even more preferably 8 or more, and still even more preferably 10 or more, from the viewpoint of mechanical strength, reduced energy loss, and dimensional stability, and the number of carbon atoms is preferably 25 or less, more preferably 20 or less, and even more preferably 18 or less, from the viewpoint of availability and improvement in reactivity. Specific examples include the same ones as those of $R_1$ in the general formula (1).

A in the general formula (2) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include a methylene group, an ethylene group, a propylene group, a butylene group, a pentylene group, a hexylene group, and the like, among which an ethylene group and a propylene group are preferred, and an ethylene group is more preferred.

n in the general formula (2) shows the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint.

The combination of A and n in the general formula (2) is preferably a combination in which A is a linear or branched, divalent saturated hydrocarbon group having 2 or more carbon atoms and 3 or less carbon atoms and n is a number of 0 or more and 20 or less, and more preferably a combination in which A is a linear or branched, divalent saturated hydrocarbon group having 2 or more carbon atoms and 3 or less carbon atoms and n is a number of 5 or more and 15 or less, from the viewpoint of reactivity and thickening effects due to exhibition of steric repulsion.

Specific examples of the substituent represented by the general formula (1) include, for example, a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, a triacontylhydroxyethyl group, and the like.

Specific examples of the substituent represented by the general formula (2) include, for example, a 3-butoxy-2-hydroxy-propyl group, a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-undecoxyethylene oxide-2-hydroxy-propyl group, a 3-undecoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, a 3-octadecoxy-2-hydroxy-propyl group, and the like. Here, the number of moles of the alkylene oxides added may be 0 or more and 50 or less. For example, the number of moles added in substituents having an oxyalkylene group such as ethylene oxide mentioned above includes substituents of 10, 12, 13, and 20 mol.

(Introduction Ratio)

In the modified cellulose fibers of the present invention, the introduction ratio of the substituent or substituents selected from substituents represented by the general formula (1) and substituents represented by the general formula (2) defined above, per mol of the anhydrous glucose unit of the cellulose, is preferably 0.001 mol or more, more preferably 0.005 mol or more, even more preferably 0.01 mol or more, even more preferably 0.05 mol or more, even more preferably 0.1 mol or more, even more preferably 0.2 mol or more, even more preferably 0.3 mol or more, and even more preferably 0.4 mol or more, from the viewpoint of affinity to the solvent. In addition, the introduction ratio is preferably 1.5 mol or less, more preferably 1.3 mol or less, even more preferably 1.0 mol or less, even more preferably 0.8 mol or less, even more preferably 0.6 mol or less, and even more preferably 0.5 mol or less, from the viewpoint of having cellulose I crystal structure and exhibiting strength. Here, when both of the substituent represented by the general formula (1) and the substituent represented by the general formula (2) are introduced, the introduction ratio refers to a total introduction molar ratio. The introduction ratio as used herein can be measured in accordance with the method described in Examples set forth below, which may be also described as an introduction molar ratio or modification ratio.

(Crystallinity)

The crystallinity of the modified cellulose fibers is preferably 10% or more, more preferably 15% or more, and even more preferably 20% or more, from the viewpoint of exhibiting strength. Also, the crystallinity is preferably 90% or less, more preferably 85% or less, even more preferably 80% or less, and even more preferably 75% or less, from the viewpoint of availability of the raw materials. Here, the crystallinity of the cellulose as used herein refers to a cellulose I crystallinity which is calculated from diffraction intensity values according to X-ray diffraction method, which can be measured by the method described in Examples set forth below. Here, the cellulose I refers to a crystal form of natural cellulose, and the cellulose I crystallinity means a proportion of the amount of crystalline region that occupies the entire cellulose. In addition, the modified cellulose fibers of the present invention do not greatly fluctuate in crystallinity and cellulose crystal forms by the presence or absence of the finely fibrillating treatment.

[Method for Producing Modified Cellulose Fibers]

In the modified cellulose fibers of the present invention, the above substituent is bonded to the surface of the cellulose fibers via an ether bond as mentioned above, and the introduction of the substituent can be carried out in accordance with a known method without particular limitations.

Specifically, the cellulose-based raw material may be reacted with a compound having the above substituent in the presence of a base.

(Cellulose-Based Raw Material)

The cellulose-based raw material usable in the present invention includes, but not particularly limited to, woody raw materials (needle-leaf trees and broad-leaf trees); grassy raw materials (plant raw materials of Gramineae, Malvaceae, and Fabaceae, non-woody raw materials of plants of Palmae); pulps (cotton linter pulps obtained from fibers surrounding the cottonseeds, etc.); and papers (newspapers, corrugated cardboards, magazines, high-quality paper, etc.). Among them, woody and grassy raw materials are preferred, from the viewpoint of availability and costs.

The shape of the cellulose-based raw material is, but not particularly limited to, preferably fibrous, powdery, spherical, chip-like, or flaky, from the viewpoint of handling property. Also, it may be a mixture of these shapes.

In addition, the cellulose-based raw material can be previously subjected to at least one pretreatment selected from biochemical treatment, chemical treatment, and mechanical treatment, from the viewpoint of handing property and the like. In the biochemical treatment, the chemical used is not particularly limited, and the biochemical treatment includes, for example, a treatment using an enzyme such as endoglucanase, exoglucanase, or beta-glucosidase. In the chemical treatment, the chemical used is not particularly limited, and the chemical treatment includes, for example, an acid treatment with hydrochloric acid, sulfuric acid, or the like, and an oxidation treatment with hydrogen peroxide, ozone, or the like. In the mechanical treatment, the machines used and the treatment conditions are not particularly limited, and examples include roll mills such as high-pressure compression roll mills and roll-rotating mills, vertical roller mills such as ring roller mills, roller race mills or ball race mills, vessel driving medium mills such as tumbling ball mills, vibrating ball mills, vibrating rod mills, vibrating tube mills, planetary ball mills, or centrifugal fluidized bed mills, media agitating mills such as tower pulverizers, agitation tank-containing mills, flow tank-containing mills or annular mills, compact shearing mills such as high-speed centrifugal roller mills or angmills, mortar, millstone, Masscolloider, fret mills, edge-runner mills, knife mills, pin mills, cutter mills, and the like.

In addition, during the above mechanical treatment, the shape transformation by mechanical treatment can also be accelerated by adding an aid such as a solvent such as water, ethanol, isopropyl alcohol, t-butyl alcohol, toluene, or xylene, a plasticizer such as a phthalic acid compound, an adipic acid compound, or a trimellitic acid compound, a hydrogen bonding-inhibitor such as urea, an alkali (alkaline earth) metal hydroxide, or an amine-based compound. By adding the shape transformation as described above, the handling property of the cellulose-based raw materials is improved, which makes the introduction of a substituent favorable, which in turn makes it possible to also improve the physical properties of the modified cellulose fibers obtained. The amount of the additive aid used varies depending upon the additive aid used, a method of the mechanical treatment used or the like, and the amount used, based on 100 parts by mass of the raw material is usually 5 parts by mass or more, preferably 10 parts by mass or more, and more preferably 20 parts by mass or more, from the viewpoint of exhibiting the effect of accelerating the shape transformation, and the amount used is usually 10,000 parts by mass or less, preferably 5,000 parts by mass or less, and more preferably 3,000 parts by mass or less, from the viewpoint of exhibiting the effect of accelerating the shape transformation and from the viewpoint of economic advantages.

The average fiber diameter of the cellulose-based raw material is, but not particularly limited to, preferably 5 µm or more, more preferably 7 µm or more, even more preferably 10 µm or more, and even more preferably 15 µm or more, from the viewpoint of handling property and costs. In addition, the upper limit is, but not particularly set, preferably 10,000 µm or less, more preferably 5,000 µm or less, even more preferably 1,000 µm or less, even more preferably 500 µm or less, and still even more preferably 100 µm or less, from the viewpoint of handling property.

In addition, the previously finely fibrillated cellulose-based raw material may be used, from the viewpoint of reduction of production steps, and the average fiber diameter in that case is preferably 1 nm or more, more preferably 2 nm or more, even more preferably 3 nm or more, and even more preferably 10 nm or more, from the viewpoint of improvement in heat resistance. In addition, the upper limit is, but not particularly set to, preferably 500 nm or less, more preferably 300 nm or less, even more preferably 200 nm or less, even more preferably 100 nm or less, and still even more preferably 80 nm or less, from the viewpoint of handling property.

The average fiber diameter of the cellulose-based raw material can be measured in the same manner as the modified cellulose fibers mentioned above. The details are as described in Examples.

The composition of the cellulose-based raw material is not particularly limited. It is preferable that the cellulose content in the cellulose-based raw material is preferably 30% by mass or more, more preferably 50% by mass or more, and even more preferably 70% by mass or more, from the viewpoint of obtaining cellulose fibers, and the cellulose content is preferably 99% by mass or less, more preferably 98% by mass or less, even more preferably 95% by mass or less, and even more preferably 90% by mass or less, from the viewpoint of availability. Here, the cellulose content in the cellulose-based raw material refers to a cellulose content in the remainder component after removing water in the cellulose-based raw material.

In addition, the water content in the cellulose-based raw material is, but not particularly limited to, preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, from the viewpoint of availability and costs, and the water content is preferably 50% by mass or less, more preferably 40% by mass or less, even more preferably 30% by mass or less, and even more preferably 20% by mass or less, from the viewpoint of handling property.

(Base)

In the present invention, the above cellulose-based raw material is mixed with a base.

The base usable in the present invention is, but not particularly limited to, preferably one or more members selected from the group consisting of alkali metal hydroxides, alkaline earth metal hydroxides, primary to tertiary amines, quaternary ammonium salts, imidazoles and derivatives thereof, pyridine and derivatives thereof, and alkoxides, from the viewpoint of progressing etherification reaction.

The alkali metal hydroxide and the alkaline earth metal hydroxide include sodium hydroxide, potassium hydroxide, lithium hydroxide, calcium hydroxide, barium hydroxide, and the like.

The primary to tertiary amines refer to primary amines, secondary amines, and tertiary amines, and specific examples include ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, triethylamine, and the like.

The quaternary ammonium salt includes tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, tetramethylammonium bromide, and the like.

The imidazole and derivatives thereof include 1-methylimidazole, 3-aminopropylimidazole, carbonyldiimidazole, and the like.

The pyridine and derivatives thereof include N,N-dimethyl-4-aminopyridine, picoline, and the like.

The alkoxide includes sodium methoxide, sodium ethoxide, potassium t-butoxide, and the like.

The amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, from the viewpoint of progressing the etherification reaction, and the amount of the base is preferably 10 equivalents or less, more preferably 8 equivalents or less, even more preferably 5 equivalents or less, and even more preferably 3 equivalents or less, from the viewpoint of production costs.

Here, the mixing of the above cellulose-based raw material and the base may be carried out in the presence of a solvent. The solvent includes, but not particularly limited to, for example, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof.

The mixing of the cellulose-based raw material and the base is not limited in the temperature and time, so long as the components can be homogeneously mixed.

(Compound Having Substituent)

Next, a mixture of the cellulose-based raw material and the base obtained above is reacted with one or more compounds selected from a compound having a substituent represented by the above general formula (1) and a compound having a substituent represented by the general formula (2) defined above as a compound having a substituent. The compound is not particularly limited, so long as the compound is capable of bonding the above substituent during the reaction with the cellulose-based raw material, and in the present invention, it is preferable to use a compound having a cyclic structure group having reactivity, from the viewpoint of reactivity and a non-halogen-containing compound, and a compound having an epoxy group is preferably used. Each of the compounds will be exemplified hereinbelow.

As the compound having a substituent represented by the general formula (1), for example, a nonionic alkylene oxide compound represented by the following general formula (1A):

(1A)

wherein $R_1$ is a linear or branched alkyl group having 3 or more carbon atoms and 30 or less carbon atoms, is preferred. The compound may be one prepared by a known technique, or a commercially available product may be used. A total number of carbon atoms of the compound is 5 or more, preferably 6 or more, more preferably 8 or more, and even more preferably 12 or more, from the viewpoint of mechanical strength, reduced energy loss, and dimensional stability, and a total number of carbon atoms is 32 or less, preferably 27 or less, more preferably 22 or less, even more preferably 20 or less, even more preferably 18 or less, even more preferably 14 or less, and even more preferably 12 or less, from the viewpoint of mechanical strength, dimensional stability, and heat resistance.

$R_1$ in the general formula (1A) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 10 or more, from the viewpoint of mechanical strength, reduced energy loss, and dimensional stability, and the number of carbon atoms is preferably 25 or less, more preferably 20 or less, even more preferably 18 or less, even more preferably 16 or less, even more preferably 12 or less, and even more preferably 10 or less, from the viewpoint of mechanical strength, reduced energy loss, and dimensional stability. Specific examples include those listed in the section of $R_1$ in the substituent represented by the general formula (1).

Specific examples of the compound represented by the general formula (1A) include 1,2-epoxyhexane, 1,2-epoxydecane, and 1,2-epoxyoctadecane.

The compound having a substituent represented by the general formula (2) is, for example, preferably a nonionic glycidyl ether compound represented by the following general formula (2A):

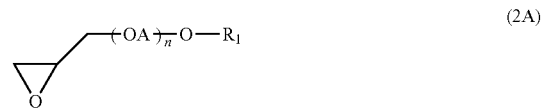

(2A)

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less. The compound may be one prepared by a known technique, or a commercially available product may be used. A total number of carbon atoms of the compound is 5 or more, preferably 6 or more, more preferably 10 or more, even more preferably 20 or more, and even more preferably 15 or more, from the viewpoint of mechanical strength, reduced energy loss, and dimensional stability, and a total number of carbon atoms is 100 or less, preferably 75 or less, more preferably 50 or less, and even more preferably 25 or less, from the viewpoint of mechanical strength, reduced energy loss, and dimensional stability.

$R_1$ in the general formula (2A) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, even more preferably 8 or more, and still even more preferably 10 or more, from the viewpoint of mechanical strength, reduced energy loss, and dimensional stability, and the number of carbon atoms is preferably 25 or less, more preferably 20 or less, and even more preferably 18 or less, from the viewpoint of mechanical strength, reduced energy loss, and dimensional stability. Specific examples include those listed in the section of $R_1$ in the substituent represented by the general formula (2).

A in the general formula (2A) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include those listed in the section of A in the substituent represented by the general formula (2), among which an ethylene group and a propylene group are preferred, and an ethylene group is more preferred.

n in the general formula (2A) is the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint.

Specific examples of the compound represented by the general formula (2A) include butyl glycidyl ether, 2-ethylhexyl glycidyl ether, dodecyl glycidyl ether, stearyl glycidyl ether, and polyoxyalkylene alkyl ethers.

The amount of the above compound can be determined by a desired introduction ratio of the substituent represented by the general formula (1) and/or the substituent represented by the general formula (2) defined above in the modified cellulose fibers obtained, and the amount of the compound, based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and even more preferably 1.0 equivalent or more, from the viewpoint of reactivity, and the amount is preferably 10 equivalents or less, more preferably 8 equivalents or less, even more preferably 6.5 equivalents or less, and even more preferably 5 equivalents or less, from the viewpoint of production costs.

(Ether Reaction)

The ether reaction of the above compound and the cellulose-based raw material can be carried out by mixing both the components in the presence of a solvent. The solvent is not particularly limited, and solvents which are exemplified as being usable in the presence of the above base can be used.

The amount of the solvent used is not unconditionally determined because the amount depends upon the kinds of the cellulose-based raw material and the above compound having a substituent, and the amount used, based on 100 parts by mass of the cellulose-based raw material, is preferably 30 parts by mass or more, more preferably 50 parts by mass or more, even more preferably 75 parts by mass or more, even more preferably 100 parts by mass or more, and even more preferably 200 parts by mass or more, from the viewpoint of reactivity, and the amount used is preferably 10,000 parts by mass or less, more preferably 5,000 parts by mass or less, even more preferably 2,500 parts by mass or less, even more preferably 1,000 parts by mass or less, and even more preferably 500 parts by mass or less, from the viewpoint of productivity.

The mixing conditions are not particularly limited so long as the cellulose-based raw material and the above compound having a substituent are homogeneously mixed, so that the reaction can be sufficiently progressed, and continuous mixing treatment may or may not be carried out. In a case where a relatively large reaction vessel having a size exceeding 1 L is used, stirring may be appropriately carried out from the viewpoint of controlling the reaction temperature.

The reaction temperature is not unconditionally determined because the reaction temperature depends upon the kinds of the cellulose-based raw material and the above compound having a substituent and an intended introduction ratio, and the reaction temperature is preferably 40° C. or higher, more preferably 50° C. or higher, and even more preferably 60° C. or higher, from the viewpoint of improving reactivity, and the reaction temperature is preferably 120° C. or lower, more preferably 110° C. or lower, and even more preferably 100° C. or lower, from the viewpoint of inhibiting pyrolysis.

The reaction time is not unconditionally determined because the reaction time depends upon the kinds of the cellulose-based raw material and the above compound having a substituent and an intended introduction ratio, and the reaction time is preferably 3 hours or more, more preferably 6 hours or more, even more preferably 10 hours or more, from the viewpoint of reactivity, and the reaction time is preferably 60 hours or less, more preferably 48 hours or less, and even more preferably 36 hours or less, from the viewpoint of productivity.

In addition, after the above reaction, for example, the same treatment as the pretreatment to which the cellulose-based raw material is subjected may be carried out for the reaction mixture to form into chips, flaky, and powdery shapes, from the viewpoint of handling property. By having the shape transformation by the above treatment, when the modified cellulose fibers of the present invention obtained are added to the rubber composition, the physical properties such as Young's modulus of the rubber composition can be improved.

Furthermore, the modified cellulose fibers of the present invention may be finely fibrillated by a known finely fibrillating treatment after the above reaction. For example, the modified cellulose fibers can be finely fibrillated by carrying out a treatment with a high-pressure homogenizer or the like in an organic solvent. In addition, the fine modified cellulose fibers can be obtained by carrying out an introduction reaction of the above substituent with a cellulose-based raw material which is previously subjected to a finely fibrillating treatment, and it is preferable that fine fibrillation is carried out by a known finely fibrillating treatment after the reaction of introduction of the above substituent, from the viewpoint of mechanical strength, reduced energy loss, and dimensional stability.

Specifically, for example, in a case where modified cellulose fibers having an average fiber diameter of 5 μm or more are obtained, a mechanical treatment can be carried out with a vessel driving medium mill, a media agitating mill or the like. Alternatively, in a case where modified cellulose fibers having an average fiber diameter of 1 nm or more and 500 nm or less are obtained, a treatment with a high-pressure homogenizer or the like in an organic solvent can be carried out.

After the reaction, a post-treatment can be appropriately carried out in order to remove an unreacted compound, an unreacted base, or the like. As the method for post-treatment, for example, an unreacted base can be neutralized with an acid (an organic acid, an inorganic acid, etc.), and thereafter washed with a solvent that dissolves the unreacted compound or base. As desired, drying (vacuum drying etc.) may be further carried out.

Thus, the modified cellulose fibers of the present invention are obtained. Accordingly, a preferred method for producing modified cellulose fibers of the present invention includes, for example, an embodiment characterized by introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base.

The modified cellulose fibers obtained have a state in which the substituent represented by the general formula (1) and/or the substituent represented by the general formula (2) is ether-bonded on the cellulose fiber surface. Specific examples include, for example, modified cellulose fibers represented by the following general formula (3):

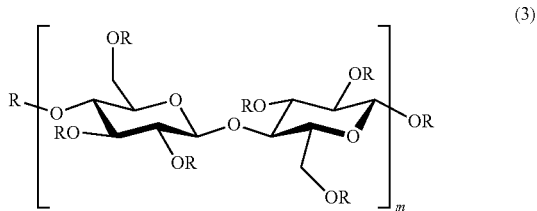

(3)

wherein R, which may be identical or different, is hydrogen, or a substituent selected from substituents represented by the general formula (1) defined above and substituents represented by the general formula (2) defined above; and m is an integer of 20 or more and 3,000 or less, with proviso that a case where all R's are simultaneously hydrogens is excluded.

In the modified cellulose fibers represented by the general formula (3), R, which may be identical or different, is hydrogen or a substituent represented by the general formula (1) and/or a substituent represented by the general formula (2), which has a repeating structure of cellulose unit into which the above substituent is introduced. As the number of repeats of the repeating structure, m in the general formula (3) may be an integer of 20 or more and 3,000 or less, and m is preferably 100 or more and 2,000 or less, from the viewpoint of mechanical strength, reduced energy loss, and dimensional stability.

[Rubber]

The rubber used in the present invention is, but not particularly limited to, preferably a diene-based rubber, from the viewpoint of reinforcing ability. Besides the diene-based rubbers, a non-diene-based rubber such as a urethane rubber, a silicone rubber, or a polysulfide rubber can also be used. The diene-based rubber includes natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), chloroprene rubber (CR), modified rubbers, and the like. The modified rubber includes epoxidized natural rubber, hydrogenated natural rubber, hydrogenated butadiene-acrylonitrile copolymer rubber (HNBR), and the like. Among them, one or more members selected from natural rubber (NR), polyisoprene rubber (IR), polybutadiene rubber (BR), styrene-butadiene copolymer rubber (SBR), a chloroprene rubber (CR), and modified rubbers are preferred, and one or more members selected from natural rubber (NR), styrene-butadiene copolymer rubber (SBR), a chloroprene rubber (CR), and modified rubbers are more preferred, from the viewpoint of satisfying both of excellent processability and high impact resilience of the rubber composition. The diene-based rubbers can be used alone or in a combination of two or more kinds.

The contents of each of the components in the rubber composition of the present invention are as follows.

The content of the rubber in the rubber composition of the present invention is preferably 30% by mass or more, more preferably 45% by mass or more, and even more preferably 55% by mass or more, from the viewpoint of mold processability of the composition, and the content is preferably 95% by mass or less, more preferably 90% by mass or less, even more preferably 80% by mass or less, and still even more preferably 70% by mass or less, from the viewpoint of containing modified cellulose fibers, and the like.

The content of the modified cellulose fibers in the rubber composition of the present invention is preferably 1% by mass or more, more preferably 2% by mass or more, even more preferably 5% by mass or more, and still even more preferably 10% by mass or more, from the viewpoint of mechanical strength, reduced energy loss, and dimensional stability of the composition obtained, and the content is preferably 30% by mass or less, more preferably 20% by mass or less, and even more 15% by mass or less, from the viewpoint of operability during the production.

The amount of the modified cellulose fibers in the rubber composition of the present invention, based on 100 parts by mass of the rubber, is preferably 1 part by mass or more, more preferably 5 parts by mass or more, even more preferably 10 parts by mass or more, and still even more preferably 15 parts by mass or more, from the viewpoint of mechanical strength, reduced energy loss, and dimensional stability obtained, and the content is preferably 30 parts by mass or less, more preferably 25 parts by mass or less, and even more preferably 20 parts by mass or less, from the viewpoint of operability during the production.

[Additives]

The rubber composition of the present invention can be optionally blended with a conventionally general amount of various additives which are blended in tires and other general rubbers, such as reinforcing fillers, vulcanization agents, vulcanization accelerators, vulcanization retarders, age resistors, process oils, vegetable fats and oils, scorching inhibitors, zinc flower, stearic acid, magnesium oxide, waxes, and phenolic resins, which are ordinarily used in the rubber industrial fields, within the range that would not impair the object of the present invention.

As the reinforcing filler, a carbon black, silica or the like is suitably used, and the carbon black includes, for example, channel black; furnace black such as SAF, ISAF, N-339, HAF, N-351, MAF, FEF, SRF, GPF, ECF, and N-234; thermal black such as FT and MT; acetylene black, and the like. The carbon black may be constituted by a single species, or carbon blacks may be constituted by plural species.

The vulcanization agent includes, for example, sulfur, sulfur compounds, oximes, nitroso compounds, polyamines, organic peroxides, and the like. The vulcanization agent may be used alone in a single species or in a combination of plural species.

The vulcanization accelerator includes, for example, guanidines, aldehyde-amines, aldehyde-ammonia, thiazoles, sulfenamides, thioureas, thiurams, dithiocarbamates, xanthates, and the like. The vulcanization accelerator may be used alone in a single species or in a combination of plural species.

The vulcanization retarder includes, for example, aromatic organic acids such as salicylic acid, phthalic anhydride, and benzoic acid, and nitroso compounds such as N-nitrosodiphenylamine, N-nitroso-2,2,4-trimethyl-1,2-dihydroquinone, and N-nitrophenyl-β-naphthylamine, and the like. The vulcanization retarder may be used alone in a single species or in a combination of plural species.

The age resistor includes, for example, amines, quinolines, hydroquinone derivatives, monophenols, polyphenols, thiobisphenols, hindered phenols, phosphite esters, and the like. The age resistor may be used alone in a single species or in a combination of plural species.

The process oil includes paraffin-based process oils, naphthenic process oils, aromatic process oils, and the like. The process oil may be used alone in a single species or in a combination of plural species.

The vegetable fats and oils include castor oil, cottonseed oil, linseed oil, rapeseed oil, soybean oil, palm oil, coconut oil, peanut oil, vegetable wax, rosins, pine oil, and the like. The vegetable fats and oils may be used alone in a single species or in a combination of plural species.

The rubber composition of the present invention can be prepared without particular limitations, so long as the rubber composition contains the rubber and the above modified cellulose fibers. For example, the rubber composition can be prepared by mixing raw materials containing the rubber and the modified cellulose fibers, and further optionally various additives with an open-type kneader such as a roller, or a tightly closed kneader such as a Banbury mixer. The temperature during mixing while in a molten state is usually from 10° to 200° C., and preferably from 20° to 180° C. In addition, the rubber composition may be prepared by preparing a solution in which a rubber and modified cellulose fibers are dissolved with an organic solvent, and thereafter removing the organic solvent component.

Accordingly, the present invention also provides a method for producing a rubber composition of the present invention.

The method for producing a rubber composition of the present invention is not particularly limited, so long as the method includes the step of mixing the rubber and the modified cellulose fibers of the present invention. For example, examples of preferred method for production include a method including the following steps:

step (1): introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, to provide modified cellulose fibers; and step (2): mixing the modified cellulose fibers obtained in the step (1), with a rubber.

In the step (1), the modified cellulose fibers of the present invention are prepared. For details, the section of the method for producing modified cellulose fibers of the present invention can be referred. Here, the modified cellulose fibers obtained can be also subjected to a subsequent step after subjecting them to a known finely fibrillating treatment.

In the step (2), the modified cellulose fibers obtained in the step (1) and the rubber are mixed. The subjects to be mixed may be only the rubber and the modified cellulose fibers, or various additives can be optionally further used. The number of mixing may be in a single bath or divided several times and mixed, and the raw materials can also be additionally supplied for each mixing step. For example, a step of mixing raw materials other than a vulcanization agent (a kneading step A) and a step of mixing the mixture obtained with a vulcanization agent (a kneading step B) may be carried out. In addition, a kneading step C may be carried out between the kneading step A and the kneading step B, under the same conditions as in the kneading step A in a state that a vulcanization agent is not mixed, for the purpose of decreasing the viscosity of the mixture obtained in the kneading step A or improving dispersibility of various additives. The mixing can be carried out by a known method with, for example, an open-type kneader such as a roller, or a tightly closed kneader such as a Banbury mixer. In addition, a rubber composition can be obtained by dissolving a rubber with an organic solvent such as toluene, mixing the rubber solution obtained with the modified cellulose fibers, and thereafter removing an organic solvent component by a drying step.

The rubber composition of the present invention can be applied to various rubber manufactured articles applications by using a rubber composition prepared by a method mentioned above, optionally subjecting the composition to appropriate mold processing, and thereafter vulcanizing or crosslinking the composition.

The rubber composition of the present invention has excellent processability and excellent reduced energy loss while showing excellent mechanical strength, so that the rubber composition can be suitably used in various applications such as daily sundries, household electric appliance parts, and automobile parts, and especially automobile applications.

In addition, as the rubber manufactured articles using the rubber composition of the present invention, for example, rubber parts for industrial use will be explained. The rubber parts for industrial use include belts and hoses, and the like, and these rubber parts can be produced by subjecting a rubber composition of the present invention optionally blended with various additives to extrusion processing in line with the shape of various parts at the unvulcanized stage to mold, thereby forming unvulcanized rubber parts, and heating the unvulcanized rubber parts with pressure in a vulcanization machine, to provide various rubber parts for industrial use. The improvement in mechanical strength can realize improvements in fundamental performance or miniaturization and thinning of parts, losses in internal heat generation owing to reduced energy loss can realize improvement in durability and the like, and dimensional stability can realize improvement in processing or engagement accuracy or the like.

In addition, for example, in a case where a tire is produced, as a rubber manufactured article using a rubber composition of the present invention, the tire can be produced by subjecting a rubber composition of the present invention optionally blended with various additives to extrusion processing in line with the shape of each part of the tire such as treads at an unvulcanized stage, molding the extruded parts on a tire molding machine by an ordinary method, pasting together with other tire parts to form an unvulcanized tire, and heating the unvulcanized tire with pressure in a vulcanization machine. The improvement in mechanical strength can realize miniaturization and thinning of various parts, the reduced energy loss can realize rolling resistance and improvement in conservation of energy, and dimensional stability can realize improvement in parts assembling accuracy and the like.

With respect to the above-mentioned embodiments, the present invention further discloses the following rubber compositions and methods for producing the rubber compositions.

<1> A rubber composition containing a rubber and modified cellulose fibers, wherein one or more substituents selected from substituents represented by the following general formula (1) and substituents represented by the following general formula (2):

$$—CH_2—CH(OH)—R_1 \quad (1)$$

$$—CH_2—CH(OH)—CH_2—(OA)_n—O—R_1 \quad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms,
are bonded to cellulose fibers via an ether bond, wherein the modified cellulose fibers have a cellulose I crystal structure.

<2> The rubber composition according to the above <1>, wherein the average fiber diameter of the modified cellulose fibers is preferably 5 µm or more, more preferably 7 µm or more, and even more preferably 10 µm or more, and preferably 100 µm or less, more preferably 70 µm or less, even more preferably 50 µm or less, even more preferably 40 µm or less and even more preferably 30 µm or less.

<3> The rubber composition according to the above <1>, wherein the average fiber diameter of the modified cellulose fibers is preferably 3 nm or more, more preferably 10 nm or more, and even more preferably 20 nm or more, and preferably 300 nm or less, more preferably 200 nm or less, even more preferably 150 nm or less, and still even more preferably 120 nm or less.

<4> The rubber composition according to any one of the above <1> to <3>, wherein the number of carbon atoms of $R_1$ in the general formula (1) is preferably 4 or more, more preferably 6 or more, and even more preferably 10 or more, and preferably 25 or less, more preferably 20 or less, even more preferably 18 or less, even more preferably 16 or less, even more preferably 12 or less, and still even more preferably 10 or less.

<5> The rubber composition according to any one of the above <1> to <4>, wherein the number of carbon atoms of $R_1$ in the general formula (2) is preferably 4 or more, more preferably 6 or more, even more preferably 8 or more, and still even more preferably 10 or more, and preferably 25 or less, more preferably 20 or less, and even more preferably 18 or less.

<6> The rubber composition according to any one of the above <1> to <5>, wherein the number of carbon atoms of A in the general formula (2) is preferably 2 or more, and preferably 4 or less, and more preferably 3 or less.

<7> The rubber composition according to any one of the above <1> to <6>, wherein A in the general formula (2) is preferably a group selected from the group consisting of a methylene group, an ethylene group, a propylene group, a butylene group, a pentylene group, and a hexylene group, an ethylene group and a propylene group are more preferred, and an ethylene group is even more preferred.

<8> The rubber composition according to any one of the above <1> to <7>, wherein n in the general formula (2) is preferably 3 or more, more preferably 5 or more, and even more preferably 10 or more, and preferably 40 or less, more preferably 30 or less, even more preferably 20 or less, and even more preferably 15 or less.

<9> The rubber composition according to any one of the above <1> to <8>, wherein the combination of A and n in the general formula (2) is preferably a combination in which A is a linear or branched, divalent saturated hydrocarbon group having 2 or more carbon atoms and 3 or less carbon atoms, and n is a number of 0 or more and 20 or less, and more preferably a combination in which A is a linear or branched, divalent saturated hydrocarbon group having 2 or more carbon atoms and 3 or less carbon atoms, and n is a number of 5 or more and 15 or less.

<10> The rubber composition according to any one of the above <1> to <9>, wherein the substituent represented by the general formula (1) is preferably a group selected from a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, and a triacontylhydroxyethyl group.

<11> The rubber composition according to any one of the above <1> to <10>, wherein the substituent represented by the general formula (2) is preferably a group selected from a 3-butoxy-2-hydroxy-propyl group, a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-undecoxyethylene oxide-2-hydroxy-propyl group, a 3-undecoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, and a 3-octadecoxy-2-hydroxy-propyl group.

<12> The rubber composition according to any one of the above <1> to <11>, wherein the introduction ratio of the substituents selected from the substituents represented by the general formula (1) and the substituents represented by the general formula (2) as defined above, per mol of the anhydrous glucose unit of the cellulose, is preferably 0.001 mol or more, more preferably 0.005 mol or more, even more preferably 0.01 mol or more, even more preferably 0.05 mol or more, even more preferably 0.1 mol or more, even more preferably 0.2 mol or more, even more preferably 0.3 mol or more, and even more preferably 0.4 mol or more, and preferably 1.5 mol or less, more preferably 1.3 mol or less, even more preferably 1.0 mol or less, even more preferably 0.8 mol or less, even more preferably 0.6 mol or less, and even more preferably 0.5 mol or less.

<13> The rubber composition according to any one of the above <1> to <12>, wherein the crystallinity of the modified cellulose fibers is preferably 10% or more, more preferably 15% or more, and even more preferably 20% or more, and preferably 90% or less, more preferably 85% or less, even more preferably 80% or less, and even more preferably 75% or less.

<14> The rubber composition according to any one of the above <1> to <13>, wherein the modified cellulose fibers are represented by the following general formula (3):

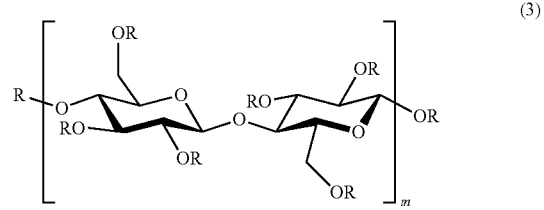

wherein R, which may be identical or different, is hydrogen, or a substituent selected from substituents represented by the general formula (1) defined above and substituents represented by the general formula (2) defined above; and m is an integer of 20 or more and 3,000 or less, with proviso that a case where all R's are simultaneously hydrogens is excluded.

<15> The rubber composition according to any one of the above <1> to <14>, wherein in the modified cellulose fibers represented by the general formula (3), R, which may be identical or different, is hydrogen, or a substituent represented by the general formula (1) and/or a substituent represented by the general formula (2), with proviso that a case where all R's are simultaneously hydrogens is excluded, wherein the modified cellulose fibers have a repeating structure of cellulose units into which the substituent is introduced, and wherein m in the general formula (3) is preferably 100 or more and 2,000 or less.

<16> The rubber composition according to any one of the above <1> to <15>, wherein as the rubber, a diene-based rubber or a non-diene-based rubber can be used, and the diene-based rubber is preferred.

<17> The rubber composition according to the above <16>, wherein as the diene rubber, one or more members selected from natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), chloroprene rubber (CR) and modified rubbers are preferred, one or more members selected from natural rubber (NR), polyisoprene rubber (IR), polybutadiene rubber (BR), styrene-butadiene copolymer rubber (SBR), a chloroprene rubber (CR), and modified rubbers are more preferred, and one or more members selected from natural rubber (NR), styrene-butadiene copolymer rubber (SBR), a chloroprene rubber (CR), and modified rubbers are even more preferred.

<18> The rubber composition according to any one of the above <1> to <17>, wherein the content of the rubber in the rubber composition is preferably 30% by mass or more, more preferably 45% by mass or more, and even more preferably 55% by mass or more, and preferably 95% by mass or less, more preferably 90% by mass or less, even more preferably 80% by mass or less, and still even more preferably 70% by mass or less.

<19> The rubber composition according to any one of the above <1> to <18>, wherein the content of the modified cellulose fibers in the rubber composition is preferably 1% by mass or more, more preferably 2% by mass or more, even more preferably 5% by mass or more, and still even more preferably 10% by mass or more, and preferably 30% by mass or less, more preferably 20% by mass or less, and even more preferably 15% by mass or less.

<20> The rubber composition according to any one of the above <1> to <19>, wherein the amount of the modified cellulose fibers in the rubber composition, based on 100 parts by mass of the rubber, is preferably 1 part by mass or more, more preferably 5 parts by mass or more, even more preferably 10 parts by mass or more, and still even more preferably 15 parts by mass or more, and preferably 30 parts by mass or less, more preferably 25 parts by mass or less, and even more preferably 20 parts by mass or less.

<21> The rubber composition according to any one of the above <1> to <20>, wherein the rubber composition can be blended with a conventionally general amount of various additives which are blended for use in tires and other general rubbers, such as reinforcing fillers, vulcanization agents, vulcanization accelerators, vulcanization retarders, age resistors, process oils, vegetable fats and oils, scorching inhibitors, zinc flower, stearic acid, magnesium oxide, waxes, and phenolic resins, which are ordinarily used in the rubber industrial fields, as other components besides those mentioned above.

<22> The rubber composition according to the above <21>, wherein as the reinforcing filler, a carbon black or silica is suitably used.

<23> The resin composition according to any one of the above <1> to <22>, wherein the composition can be prepared by mixing raw materials containing the rubber and the above modified cellulose fibers, and further optionally various additives with an open-type kneader such as a roller, or a tightly closed kneader such as a Banbury mixer.

<24> A method for producing a rubber composition, including the step of mixing a rubber and modified cellulose fibers as defined in any one of the above <1> to <23>.

<25> The method for producing a rubber composition according to the above <24>, including reacting a cellulose-based raw material with a compound selected from a compound having a substituent represented by the general formula (1) and a compound having a substituent represented by the general formula (2), in the presence of a base, in the modified cellulose fibers.

<26> The method for producing a rubber composition according to the above <25>, wherein the average fiber diameter of the cellulose-based raw material is preferably 5 μm or more, more preferably 7 μm or more, even more preferably 10 μm or more, and even more preferably 15 μm or more, and preferably 10,000 μm or less, more preferably 5,000 μm or less, even more preferably 1,000 μm or less, even more preferably 500 μm or less, and still even more preferably 100 μm or less.

<27> The method for producing a rubber composition according to the above <25>, wherein the average fiber diameter of the cellulose-based raw material is preferably 1 nm or more, more preferably 2 nm or more, even more preferably 3 nm or more, and even more preferably 10 nm or more, and preferably 500 nm or less, more preferably 300 nm or less, even more preferably 200 nm or less, even more preferably 100 nm or less, and still even more preferably 80 nm or less.

<28> The method for producing a rubber composition according to any one of the above <25> to <27>, wherein the cellulose content in the cellulose-based raw material is preferably 30% by mass or more, more preferably 50% by mass or more, and even more preferably 70% by mass or more, and preferably 99% by mass or less, more preferably 98% by mass or less, even more preferably 95% by mass or less, and even more preferably 90% by mass or less.

<29> The method for producing a rubber composition according to any one of the above <25> to <28>, wherein the water content in the cellulose-based raw material is preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, and preferably 50% by mass or less, more preferably 40% by mass or less, even more preferably 30% by mass or less, and even more preferably 20% by mass or less.

<30> The method for producing a rubber composition according to any one of the above <25> to <29>, wherein the cellulose-based raw material is mixed with a base.

<31> The method for producing a rubber composition according to any one of the above <25> to <30>, wherein the base is preferably one or more members selected from the group consisting of alkali metal hydroxides, alkaline earth metal hydroxides, primary to tertiary amines, quaternary ammonium salts, imidazole and derivatives thereof, pyridine and derivatives thereof, and alkoxides.

<32> The method for producing a rubber composition according to the above <31>, wherein the alkali metal hydroxides and the alkaline earth metal hydroxide are selected from the group consisting of sodium hydroxide, potassium hydroxide, lithium hydroxide, calcium hydroxide, and barium hydroxide.

<33> The method for producing a rubber composition according to the above <31>, wherein the primary to tertiary amines are selected from the group consisting of ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, and triethylamine.

<34> The method for producing a rubber composition according to the above <31>, wherein the quaternary ammonium salt is selected from the group consisting of tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, and tetramethylammonium bromide.

<35> The method for producing a rubber composition according to the above <31>, wherein the imidazole and derivatives thereof are selected from the group consisting of 1-methylimidazole, 3-aminopropylimidazole, and carbonyldiimidazole.

<36> The method for producing a rubber composition according to the above <31>, wherein the pyridine and derivatives thereof are selected from the group consisting of N,N-dimethyl-4-aminopyridine and picoline.

<37> The method for producing a rubber composition according to the above <31>, wherein the alkoxide is selected from the group consisting of sodium methoxide, sodium ethoxide, and potassium t-butoxide.

<38> The method for producing a rubber composition according to any one of the above <25> to <37>, wherein the amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, and preferably 10 equivalents or less, more preferably 8 equivalents or less, even more preferably 5 equivalents or less, and even more preferably 3 equivalents or less.

<39> The method for producing a rubber composition according to any one of the above <25> to <38>, wherein the compound having a substituent represented by the general formula (1) is preferably a nonionic alkylene oxide compound represented by the following general formula (1A):

(1A)

wherein $R_1$ is a linear or branched alkyl group having 3 or more carbon atoms and 30 or less carbon atoms, and wherein a total number of carbon atoms of the compound is 5 or more, preferably 6 or more, more preferably 8 or more, and even more preferably 12 or more, and 32 or less, preferably 27 or less, more preferably 22 or less, even more preferably 20 or less, even more preferably 18 or less, even more preferably 14 or less, and even more preferably 12 or less.

<40> The method for producing a rubber composition according to the above <39>, wherein the number of carbon atoms of $R_1$ in the general formula (1A) is preferably 4 or more, more preferably 6 or more, and even more preferably 10 or more, and preferably 25 or less, more preferably 20 or less, even more preferably 18 or less, even more preferably 16 or less, even more preferably 12 or less, and even more preferably 10 or less.

<41> The method for producing a rubber composition according to the above <39> or <40>, wherein the compound represented by the general formula (1A) is selected from the group consisting of 1,2-epoxyhexane, 1,2-epoxydecane, and 1,2-epoxyoctadecane.

<42> The method for producing a rubber composition according to any one of the above <25> to <38>, wherein the compound having a substituent represented by the general formula (2) is preferably a nonionic glycidyl ether compound represented by the following general formula (2A):

$$\underset{O}{\triangle}\!\!\!\!\diagdown\!\!(OA)_n\!-\!O\!-\!R_1 \quad (2A)$$

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less, and wherein a total number of carbon atoms of the compound is 5 or more, preferably 6 or more, more preferably 10 or more, and even more preferably 20 or more, and 100 or less, preferably 75 or less, more preferably 50 or less, and even more preferably 25 or less. <43> The method for producing a rubber composition according to the above <42>, wherein the number of carbon atoms of $R_1$ in the general formula (2A) is preferably 4 or more, more preferably 6 or more, even more preferably 8 or more, and still even more preferably 10 or more, and preferably 25 or less, more preferably 20 or less, and even more preferably 18 or less.

<44> The method for producing a rubber composition according to the above <42> or <43>, wherein the number of carbon atoms of A in the general formula (2A) is preferably 2 or more, and preferably 4 or less, and more preferably 3 or less.

<45> The method for producing a rubber composition according to any one of the above <42> to <44>, wherein n in the general formula (2A) is preferably 3 or more, more preferably 5 or more, and even more preferably 10 or more, and preferably 40 or less, more preferably 30 or less, even more preferably 20 or less, and even more preferably 15 or less.

<46> The method for producing a rubber composition according to any one of the above <42> to <45>, wherein the compound represented by the general formula (2A) is selected from the group consisting of butyl glycidyl ether, 2-ethylhexyl glycidyl ether, dodecyl glycidyl ether, stearyl glycidyl ether, and polyoxyalkylene alkyl ethers.

<47> The method for producing a rubber composition according to any one of the above <25> to <46>, wherein the used amount of the compound having a substituent represented by the general formula (1) and/or the compound having a substituent represented by the general formula (2), based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and even more preferably 0.1 equivalents or more, and preferably 10 equivalents or less, more preferably 8 equivalents or less, even more preferably 6.5 equivalents or less, and even more preferably 5 equivalents or less.

<48> The method for producing a rubber composition according to any one of the above <25> to <47>, wherein as the solvent, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof can be used.

<49> The method for producing a rubber composition according to the above <48>, wherein the amount of solvent used, based on 100 parts by mass of the cellulose-based raw material, is preferably 30 parts by mass or more, more preferably 50 parts by mass or more, even more preferably 75 parts by mass or more, even more preferably 100 parts by mass or more, and even more preferably 200 parts by mass or more, and preferably 10,000 parts by mass or less, more preferably 5,000 parts by mass or less, even more preferably 2,500 parts by mass or less, even more preferably 1,000 parts by mass or less, and even more preferably 500 parts by mass or less.

<50> The method for producing a rubber composition according to any one of the above <25> to <49>, wherein the reaction temperature is preferably 40° C. or higher, more preferably 50° C. or higher, and even more preferably 60° C. or higher, and preferably 120° C. or lower, more preferably 110° C. or lower, and even more preferably 100° C. or lower.

<51> The method for producing a rubber composition according to any one of the above <25> to <50>, wherein the reaction time is preferably 3 hours or more, more preferably 6 hours or more, and even more preferably 10 hours or more, and preferably 60 hours or less, more preferably 48 hours or less, and even more preferably 36 hours or less.

<52> The method for producing a rubber composition according to any one of the above <25> to <51>, including, after the above reaction, further carrying out a known finely fibrillating treatment.

<53> The method for producing a rubber composition according to any one of the above <24> to <52>, including the following steps of:

step (1): introducing one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, to provide modified cellulose fibers; and step (2): mixing the modified cellulose fibers obtained in the step (1) with a rubber.

<54> The rubber composition according to any one of the above <1> to <23>, which can be suitably used in various applications such as daily sundries, household electric appliance parts, and automobile parts.

<55> A rubber part for industrial use containing a rubber composition as defined in any one of the above <1> to <23>.

<56> A tire containing a rubber composition as defined in any one of the above <1> to <23>.

EXAMPLES

The present invention will be described more specifically by means of the Examples. Here, the Examples are mere exemplifications of the present invention, without intending to limit the scope of the present invention thereto. Parts in Examples are parts by mass unless specified otherwise. Here, the term "ambient pressure" is 101.3 kPa, and the term "ambient temperature (room temperature)" is 25° C.

Production Example 1 of Compound Having Substituent—Production of Stearyl Glycidyl Ether Ten kilograms of stearyl alcohol, KALCOL 8098 manufactured by Kao Corporation, 0.36 kg of tetrabutylammonium bromide manufactured by KOEI CHEMICAL COMPANY LIMITED, 7.5 kg of epichlorohydrin manufactured by Dow Chemical Company, and 10 kg of hexane were supplied into a 100-L reactor, and the contents were mixed under a nitrogen atmosphere. While holding a liquid mixture at 50° C., 12 kg of a 48% by mass aqueous sodium hydroxide solution manufactured by Nankai Chemical Co., Ltd. was added dropwise thereto over 30 minutes. After the termination of the dropwise addition, the mixture was aged at 50° C. for additional 4 hours, and thereafter washed with 13 kg of water repeatedly 8 times, to remove salts and alkali. Thereafter, the internal reactor temperature was raised to 90° C., hexane was distilled off from an upper layer, and the mixture was further purged with steam under a reduced pressure of 6.6 kPa to remove low-boiling point compounds. After dehydration, the mixture was subjected to a reduced-pressure distillation at an internal reactor temperature of 250° C. and an internal reactor pressure of 1.3 kPa, to provide 8.6 kg of white stearyl glycidyl ether.

Production Example 1 of Cellulose-Based Raw Material—Production of Alkali-Treated Bagasse As an entire treatment liquid 937 parts by mass of water, granular sodium hydroxide and ion-exchanged water in an amount so that sodium hydroxide would be 15.2 parts by mass, were added, based on 100 parts by mass of bagasse on a dry basis, the residual sugar cane, and the contents were heat-treated at a temperature of 120° C. for 2 hours in an autoclave manufactured by TOMY SEIKO CO., LTD., LSX-700. After the treatment, the mixture was filtered and washed with ion-exchanged water, and vacuum-dried for one day and night at 70° C., to provide alkali-treated bagasse in a fibrous form, having an average fiber diameter of 24 μm, a cellulose content of 70% by mass, and a water content of 3% by mass.

Production Example 2 of Cellulose-Based Raw Material—Production of Powdery Cellulose A One-hundred grams of needle-leaf bleached kraft pulp, hereinafter abbreviated as NBKP, manufactured by Fletcher Challenge Canada Ltd., "Machenzie," CSF 650 ml, in a fibrous form, having an average fiber diameter of 24 µm, a cellulose content of 90% by mass, and a water content of 5% by mass, were weighed out on dry basis, supplied into a batch-type vibrating mill manufactured by CHUO KAKOHKI CO., LTD "MB-1," vessel entire volume: 3.5 L, 13 rods made of SUS304 being used, each rod having a diameter .phi. of 30 mm, a length of 218 mm, and cross-sectional shape of circular, rod filling ratio of 57%, and subjected to a pulverization treatment for 20 minutes, to provide a powdery cellulose A having an average fiber diameter of 25 µm, a crystallinity of 35%, and a water content of 3% by mass.

Example 1

Modification with 1,2-Epoxyhexane

The alkali-treated bagasse prepared in Production Example 1 of Cellulose-Based Raw Material was used as cellulose fibers. One hundred grams of the absolutely dried alkali-treated bagasse was supplied to a kneader manufactured by IRIE SHOKAI Co., Ltd., model PNV-1, capacity: 1.0 L equipped with a reflux tube and a dropping funnel, and 100 g of a 6.4% by mass aqueous sodium hydroxide solution, prepared from sodium hydroxide granules manufactured by Wako Pure Chemical Industries, Ltd. and ion-exchanged water (0.26 equivalent per AGU: calculated by assuming that the cellulose-based raw material is entirely constituted by anhydrous glucose units, hereinafter referred to the same) and 100 g of isopropanol were sequentially added, and thereafter the mixture was stirred at room temperature at 50 rpm for 30 minutes to homogeneously mix. Further, 92.7 g of 1,2-epoxyhexane manufactured by Wako Pure Chemical Industries, Ltd. (1.5 equivalents per AGU) was added dropwise in 1 minute, and the reaction was carried out at 70° C. for 24 h under reflux conditions while stirring. After the reaction, the reaction mixture was neutralized with acetic acid manufactured by Wako Pure Chemical Industries, Ltd., and the mixture was sufficiently washed with a mixed solvent of water/isopropanol to remove impurities, and further vacuum-dried overnight at 50° C., to provide modified cellulose fibers.

Using modified cellulose fibers obtained above, a rubber composition was produced. Styrene-butadiene copolymer SBR manufactured by ZEON Corporation, Nipol NS210 was used as a rubber. Components excluding a vulcanization accelerator and sulfur in a blending component listed in Table 1 were kneaded for 6 minutes with a 50-milliliter tightly closed-type mixer, and the vessel was opened when the temperature reached 150° C., to provide a rubber composition (kneading step A). To the rubber composition were added vulcanization accelerators N-(tert-butyl)-2-benzothiazolyl sulfenamine (TBBS), di-2-benzothiazolyl disulfide (MBTS), and 1,3-diphenyl guanidine (DPG), zinc oxide and sulfur, the contents were kneaded with a 50-milliliter tightly closed-type mixer for 3 minutes, and the vessel was opened when the temperature reached 100° C., to provide an unvulcanized rubber composition (kneading step B). The rubber composition obtained was subjected to vulcanization treatment in a die having dimensions of 15×15×0.2 cm at 145° C. for 20 minutes, to provide a vulcanized rubber sheet having a thickness of about 0.2 mm.

Example 31

Modification with 1,2-Epoxyhexane

To 1.5 g of absolutely dried NBKP were added 1.5 g of a 6.4% by mass aqueous sodium hydroxide solution (NaOH, 0.26 equivalents per AGU) and 1.5 g of isopropanol, and the mixture was homogeneously mixed. Thereafter, 1.4 g of 1,2-epoxyhexane (1.5 equivalents per AGU) was added thereto, and the contents were tightly sealed, and thereafter reacted while allowing to stand at 70° C. for 24 h. After the reaction, the reaction mixture was neutralized with acetic acid, and sufficiently washed with a mixed solvent of water/isopropanol to remove impurities. Further, the mixture was vacuum-dried overnight at 50° C. to provide modified cellulose fibers.

Using modified cellulose fibers obtained, the same treatments as in the method described in Example 1 were carried out, in a blending component listed in Table 1, to provide a vulcanized rubber sheet.

Example 32

Modification with 1,2-Epoxydecane

To 1.5 g of absolutely dried NBKP were added 6.0 g of dimethylformamide manufactured by Wako Pure Chemical Industries, Ltd. (DMF) and 1.8 g of N,N-dimethyl-4-aminopyridine (DMAP, 1.6 equivalents per AGU), and the mixture was homogeneously mixed. Thereafter, 7.2 g of 1,2-epoxydecane manufactured by Wako Pure Chemical Industries, Ltd. (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C. to provide modified cellulose fibers.

Using modified cellulose fibers obtained, the same treatments as in the method described in Example 1 were carried out, in a blending component listed in Table 1, to provide a vulcanized rubber sheet.

Example 5

Modification with 1,2-Epoxydecane

Fifty grams of the absolutely dried NBKP was supplied to a kneader equipped with a reflux tube and a dropping funnel, and 100 g of DMF and 60 g of DMAP (1.6 equivalents per AGU) were sequentially added, and thereafter the mixture was stirred at room temperature at 50 rpm for 30 minutes to homogeneously mix. Further, 141 g of 1,2-epoxydecane (5 equivalents per AGU) was added dropwise in 1 minute, and the reaction was carried out at 90° C. for 24 h under reflux conditions while stirring. After the reaction, the reaction mixture was neutralized with acetic acid, and the mixture was sufficiently washed with DMF and a mixed solvent of water/isopropanol to remove impurities, and further vacuum-dried overnight at 50° C., to provide modified cellulose fibers.

The same treatments as in the method described in Example 1 were carried out, in a blending component listed in Table 1, to provide a vulcanized rubber sheet.

Example 33

Modification with 1,2-Epoxyoctadecane

To 1.5 g of absolutely dried NBKP were added 6.0 g of DMF and 1.8 g of DMAP (1.6 equivalents per AGU), and the mixture was homogeneously mixed. Thereafter, 24.8 g of 1,2-epoxyoctadecane manufactured by Tokyo Chemical Industry Co., Ltd. (10 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities, and further vacuum-dried overnight at 50° C., to provide modified cellulose fibers.

Using modified cellulose fibers obtained, the same treatments as in the method described in Example 1 were carried out, in a blending component listed in Table 1, to provide a vulcanized rubber sheet.

Comparative Example 1

Rubber Blank

The same procedures as in Example 1 were carried out except that the modified cellulose fibers were not added, to provide a vulcanized rubber sheet.

Comparative Example 31

Modification with Propylene Oxide

The same procedures as in Example 1 were employed except that the reaction reagent was changed to propylene oxide, and that the amount of the reagent was changed to 0.16 g (0.3 equivalents per AGU), to provide modified cellulose fibers, and a vulcanized rubber sheet was prepared in the same manner as Example 1, in a blending component listed in Table 1.

Example 34

Modification with Butyl Glycidyl Ether

The same procedures as in Example 32 were employed except that the reaction reagent was changed to butyl glycidyl ether manufactured by Tokyo Chemical Industry Co., Ltd., and that the amount of the reagent was changed to 6.0 g (5 equivalents per AGU), to provide modified cellulose fibers, and a vulcanized rubber sheet was prepared in the same manner as Example 1, in a blending component listed in Table 2.

Example 35

Modification with 2-Ethylhexyl Glycidyl Ether

The same procedures as in Example 32 were employed except that the reaction reagent was changed to 2-ethylhexyl glycidyl ether manufactured by Tokyo Chemical Industry Co., Ltd., and that the amount of the reagent was changed to 8.6 g (5 equivalents per AGU), to provide modified cellulose fibers, and a vulcanized rubber sheet was prepared in the same manner as Example 1, in a blending component listed in Table 2.

Example 36

Modification with Stearyl Glycidyl Ether

The same procedures as in Example 32 were employed except that the reaction reagent was changed to stearyl glycidyl ether prepared in Production Example 1 of Compound Having Substituent, and that the amount of the reagent was changed to 31.0 g (6 equivalents per AGU), to provide modified cellulose fibers, and a vulcanized rubber sheet was prepared in the same manner as Example 1, in a blending component listed in Table 2.

Comparative Example 32

Modification with Glycidyl Methyl Ether

The same procedures as in Example 1 were employed except that the reaction reagent was changed to glycidyl methyl ether manufactured by Tokyo Chemical Industry Co., Ltd., and that the amount of the reagent was changed to 0.48 g (0.6 equivalents per AGU), to provide modified cellulose fibers, and a vulcanized rubber sheet was prepared in the same manner as Example 1, in a blending component listed in Table 2.

Examples 2 and 3

Modification with 1,2-Epoxyhexane

The same procedures as in Example 1 were carried out except that the amount of the modified cellulose fibers and the amount of carbon black were changed to those in Table 3, to provide a vulcanized rubber sheet.

Example 4

Modification with 1,2-Epoxyhexane

NBKP was used as a cellulose-based raw material, and the same treatments as those in Example 1 were carried out, to provide modified cellulose fibers.

The same treatments as the method described in Example 1 were carried out in a blending component listed in Table 3, to provide a vulcanized rubber sheet.

Example 6

Modification with 1,2-Epoxydecane

The same procedures as in Example 5 were carried out except that the amount of the modified cellulose fibers and the amount of carbon black were changed to those in Table 3, to provide a vulcanized rubber sheet.

Example 37

Modification with 1,2-Epoxyhexane

The same procedures as in Example 31 were carried out except that the amount of carbon black was changed to that in Table 3, to provide a vulcanized rubber sheet.

Example 38

Modification with 1,2-Epoxyoctadecane

The same procedures as in Example 33 were carried out except that the amount of carbon black was changed to that in Table 3, to provide a vulcanized rubber sheet.

Example 39

Modification with Butyl Glycidyl Ether

The same procedures as in Example 34 were carried out except that the amount of carbon black was changed to that in Table 3, to provide a vulcanized rubber sheet.

Example 40

Modification with Stearyl Glycidyl Ether

The same procedures as in Example 36 were carried out except that the amount of carbon black was changed to that in Table 3, to provide a vulcanized rubber sheet.

Comparative Example 2

Rubber Blank+Carbon Black

The same procedures as in Comparative Example 1 were carried out except that the carbon black was added in an amount of 50 parts by mass, to provide a vulcanized rubber sheet.

Comparative Example 3

Rubber Blank+Carbon Black

The same procedures as in Comparative Example 2 were carried out except that the alkali-treated bagasse prepared in Production Example 1 of Cellulose-Based Raw Material was directly added in an amount of 10 parts by mass without chemical modification, to provide a vulcanized rubber sheet.

Example 41

Using LBKP as Raw Material

A broad-leaf bleached kraft pulp (hereinafter abbreviated as LBKP) derived from *eucalyptus*, manufactured by CENIBRA, in a fibrous form, having an average fiber diameter of 24 nm, a cellulose content of 90% by mass, and a water content of 5% by mass was used as a raw material cellulose. One hundred grams of the absolutely dried LBKP was supplied to a kneader manufactured by IRIE SHOKAI Co., Ltd., model PNV-1, capacity: 1.0 L equipped with a reflux tube and a dropping funnel, and 100 g of 6.4% by mass aqueous sodium hydroxide solution (0.26 equivalent per AGU) and 100 g of isopropanol were sequentially added thereto, and thereafter the mixture was stirred at room temperature at 50 rpm for 30 minutes to homogeneously mix. Further, 92.7 g of 1,2-epoxyhexane (1.5 equivalents per AGU) was added dropwise in 1 minute, and the reaction was carried out at 70.degree. C. for 24 h under reflux conditions while stirring. After the reaction, the reaction mixture was neutralized with acetic acid, and the mixture was sufficiently washed with a mixed solvent of water/isopropanol to remove impurities, and further vacuum-dried overnight at 50.degree. C., to provide modified cellulose fibers.

Using modified cellulose fibers obtained, the same treatments as in the method described in Example 1 were carried out, in a blending component listed in Table 4, to provide a vulcanized rubber sheet.

Example 42<Using HYP as Raw Material>

The same procedures as in Example 41 were employed except that the raw material used was changed to High Yield Pulp (hereinafter abbreviated as HYP) derived from spruce, manufactured by Rottneros, in a fibrous form, having an average fiber diameter of 28 nm a cellulose content of 55% by mass, and a water content of 15% by mass, to provide modified cellulose fibers.

Using modified cellulose fibers obtained, the same treatments as in the method described in Example 1 were carried out, in a blending component listed in Table 4, to provide a vulcanized rubber sheet.

Example 43

Using ARBOCELL as Raw Material

The same procedures as in Example 41 were employed except that the raw material used was changed to ARBOCELL BC200 (hereinafter abbreviated as ARBOCELL), manufactured by Rettenmaier Co., Ltd., in a powdery form, having an average fiber diameter of 65 µm, a cellulose content of 90% by mass, and a water content of 5% by mass, to provide modified cellulose fibers.

Using modified cellulose fibers obtained, the same treatments as in the method described in Example 1 were carried out, in a blending component listed in Table 4, to provide a vulcanized rubber sheet.

Example 44

Using Powdery Cellulose A as Raw Material

The same procedures as in Example 41 were employed except that the raw material used was changed to a powdery cellulose A prepared in Production Example 2 of Cellulose-Based Raw Material, in a powdery form, having an average fiber diameter of 25 µm, a cellulose content of 90% by mass, and a water content of 3% by mass, to provide modified cellulose fibers.

Using modified cellulose fibers obtained, the same treatments as in the method described in Example 1 were carried out, in a blending component listed in Table 4, to provide a vulcanized rubber sheet.

Example 45

Using Modified Cellulose Fibers (Pulverized Product)

The same treatments as the method described in Example 1 were carried out in a blending component listed in Table 5 using powdery modified cellulose fibers obtained by previously supplying 100 g of the modified cellulose fibers obtained in the same manner as Example 36 on dry basis into a batch-type vibrating mill "MB-1" manufactured by CHUO KAKOHKI CO., LTD, having a reactor entire volume of 3.5 L, using 13 rods made of SUS304 having a diameter φ of 30 mm, a length of 218 mm, a cross-sectional shape of circular, and a rod filling ratio of 57%, and subjecting the contents to a pulverization treatment for 20 minutes, to provide a vulcanized rubber sheet.

Example 46

Using Modified Cellulose Fibers (Pulverized Product)

The same treatments as the method described in Example 1 were carried out in a blending component listed in Table 5 using powdery modified cellulose fibers obtained by previously supplying 50 g of the modified cellulose fibers obtained in the same manner as Example 36 on dry basis mixed with 25 g of water into a batch-type vibrating mill "MB-1" manufactured by CHUO KAKOHKI CO., LTD, having a reactor entire volume of 3.5 L, using 13 rods made of SUS304 having a diameter φ of 30 mm, a length of 218 mm, a cross-sectional shape of circular, and a rod filling ratio of 57%, and subjecting the contents to a pulverization treatment for 20 minutes, to provide a vulcanized rubber sheet.

Example 47

Using Modified Cellulose Fibers (Pulverized Product)

The same treatments as the method described in Example 1 were carried out except that a step of kneading the modified cellulose fibers obtained in the same manner as Example 36 for 6 minutes in a blending component listed in Table 5 with a tightly closed type mixer between the kneading step A and the kneading step B, and opening the vessel when the temperature reached 150° C. to provide a rubber composition (kneading step C) was added, to provide a vulcanized rubber sheet.

Example 48

Using Modified Cellulose Fibers (Pulverized Product)

Using the modified cellulose fibers obtained in the same manner as Example 36, the same treatments as the method described in Example 1 were carried out except that Si69 manufactured by Evonik Industries was added thereto as a silane coupling agent in an amount of 2% by mass based on SBR during the kneading step A in a blending component listed in Table 5, to provide a vulcanized rubber sheet.

Example 10

Using Modified Cellulose Fibers (Finely Fibrillating Treatment Product)

To 1.5 g of absolutely dried NBKP were added 6.0 g of DMF and 1.8 g of DMAP (1.6 equivalents per AGU), and the mixture was homogeneously mixed. Thereafter, 12.4 g of 1,2-epoxyoctadecane (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities, and further vacuum-dried overnight at 50° C. to provide modified cellulose fibers.

The amount 0.50 g of the modified cellulose fibers obtained were supplied into 49.50 g of toluene manufactured by Wako Pure Chemical Industries, Ltd., and the mixture was stirred with a homogenizer T.K. ROBOMICS manufactured by PRIMIX Corporation at 3,000 rpm for 30 minutes, and thereafter subjected to a 10-pass treatment with a high-pressure homogenizer "NanoVater L-ES" manufactured by YOSHIDA KIKAI CO., LTD. at 100 MPa, to provide a fine modified cellulose dispersion in which finely fibrillated modified cellulose fibers were dispersed in toluene, a solid content concentration of which was 1.0% by mass.

Twenty grams of the fine modified cellulose dispersion obtained above, 2.0 g of styrene-butadiene copolymer SBR, 0.04 g of stearic acid, 0.06 g of zinc oxide, 0.03 g of sulfur, 0.01 g of TBBS, 0.01 g of MBTS, 0.01 g of DPG, and 20 g of toluene were mixed, and the mixture was stirred at room temperature of 25° C. for 2 hours. After confirmation of dissolution, the resulting solution was subjected to finely fibrillating treatment on 1-pass at 60 MPa and 1-pass at 100 MPa with a high-pressure homogenizer. The resulting dispersion was poured to a glass petri dish, to remove toluene for 2 days at room temperature and ambient pressure. Thereafter, the dispersion was dried at room temperature for 12 hours with a vacuum drier, and the dried product was subjected to vulcanization at 150° C. for 1 hour, to provide a vulcanized rubber sheet having a thickness of about 0.2 mm.

Example 49

Using Modified Cellulose Fibers (Finely Fibrillating Treatment Product)

Using the modified cellulose fibers obtained in the same manner as Example 33, the same treatments as in Example 10 were carried out to provide a fine modified cellulose dispersion, and the same treatments as the method described in Example 10 were carried out using the fine modified cellulose dispersion in a blending component listed in Table 6 to provide a vulcanized rubber sheet.

Example 11

Using Modified Cellulose Fibers (Finely Fibrillating Treatment Product)

To 1.5 g of absolutely dried NBKP were added 6.0 g of acetonitrile manufactured by Wako Pure Chemical Industries, Ltd. and 2.7 g of tetrabutylammonium hydroxide manufactured by Wako Pure Chemical Industries, Ltd., a 10% aqueous solution (TBAH, 0.8 equivalents per AGU), and the mixture was homogeneously mixed. Thereafter, 15.5 g of stearyl glycidyl ether prepared in Production Example 1 of Compound Having Substituent (3 equivalents per AGU) was added thereto, and the contents were tightly sealed, and thereafter reacted while allowing to stand at 70° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers. Using the modified cellulose fibers obtained, the same finely fibrillating treatments as in Example 10 were carried out, to provide a fine modified cellulose dispersion in which finely fibrillated modified cellulose fibers were dispersed in toluene, a solid content concentration of which was 1.0% by mass.

Using the fine modified cellulose dispersion obtained, the same treatments as in Example 10 were carried out, to provide a vulcanized rubber sheet having a thickness of about 0.2 mm.

Example 50

Using Modified Cellulose Fibers (Fine Cellulose Fibers)

Using the modified cellulose fibers obtained in the same manner as in Example 32, the same treatments as in Example 10 were carried out, to provide a fine modified cellulose dispersion. Using the fine modified cellulose dispersion obtained, the same treatments as the method described in Example 10 were carried out in a blending component listed in Table 6, to provide a vulcanized rubber sheet.

Example 51

Using Modified Cellulose Fibers (Fine Cellulose Fibers)

To 1.5 g of microfibrillated cellulose, as a solid content, which was previously subjected to solvent replacement with DMF, manufactured by Daicel FineChem Ltd., under the trade name of "CELISH FD100-G," as a cellulose-based raw material was added 1.8 g of DMAP (1.6 equivalents per AGU), and the mixture was homogeneously mixed. Thereafter, 7.2 g of 1,2-epoxydecane (5 equivalents per AGU) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C. to provide modified cellulose fibers.

Using the modified cellulose fibers obtained, the same treatments as in Example 10 were carried out, to provide a fine modified cellulose dispersion. Using the fine modified cellulose dispersion obtained, the same treatments as the method described in Example 10 were carried out in a blending component listed in Table 6, to provide a vulcanized rubber sheet.

Example 52

Using Modified Cellulose Fibers (Fine Cellulose Fibers)

Using the modified cellulose fibers obtained in the same manner as in Example 36, the same treatments as in Example 10 were carried out, to provide a fine modified cellulose dispersion. Using the fine modified cellulose dispersion obtained, the same treatments as the method described in Example 10 were carried out in a blending component listed in Table 6, to provide a vulcanized rubber sheet.

Comparative Example 4

Rubber Blank

The same procedures as in Example 10 were carried out except that the modified cellulose fibers were not added, to provide a vulcanized rubber sheet.

The modified cellulose fibers obtained were evaluated for substituent introduction ratio, average fiber diameters of modified cellulose fibers, fine modified cellulose dispersion and cellulose-based raw material, and confirmation of the crystal structure (crystallinity) in accordance with the methods of the following Test Examples 1 to 4. In addition, the properties of the vulcanized rubber sheet were each evaluated in accordance with the following Test Examples 5 to 6. The results are shown in Tables 1 to 6.

Here, raw materials in Tables 1 to 6 are as follows.
[Rubber]
SBR: Nipol NS210, manufactured by ZEON Corporation
[Additives]
Carbon Black: Seast 3, manufactured by Toyo Carbon Co., Ltd.
Stearic Acid: Lunac S-70V, industrial stearic acid, manufactured by Kao Corporation
Sulfur: vulcanizing agent, manufactured by Wako Pure Chemical Industries, Ltd.
Zinc Oxide: manufactured by Wako Pure Chemical Industries, Ltd.
TBBS: vulcanization accelerator, manufactured by Wako Pure Chemical Industries, Ltd.
MBTS: vulcanization accelerator, manufactured by Tokyo Chemical Industry Co., Ltd.
DPG: vulcanization accelerator, manufactured by Wako Pure Chemical Industries, Ltd.

Test Example 1

Substituent Introduction Ratio, Degree of Substitution

The % content (% by mass) of the hydrophobic ether group contained in the modified cellulose fibers obtained was calculated in accordance with Zeisel method, which has been known as a method of analyzing an average number of moles added of alkoxy groups of the cellulose ethers described in *Analytical Chemistry*, 51(13), 2172 (1979), "Fifteenth Revised Japan Pharmacopeia (Section of Method of Analyzing Hydroxypropyl Cellulose)" or the like. The procedures are shown hereinbelow.

(i) To a 200 mL volumetric flask was added 0.1 g of n-octadecane, and filled up to a marked line with hexane, to provide an internal standard solution.
(ii) One-hundred milligrams of modified cellulose fibers previously purified and dried, and 100 mg of adipic acid were accurately weighed in a 10 mL vial jar, 2 mL of hydrogen iodide was added thereto, and the vial jar was tightly sealed.
(iii) The mixture in the above vial jar was heated with a block heater at 160° C. for 1 hour, while stirring with stirrer chips.
(iv) After heating, 3 mL of the internal standard solution and 3 mL of diethyl ether were sequentially injected to the vial, and a liquid mixture was stirred at room temperature for 1 minute.
(v) An upper layer (diethyl ether layer) of the mixture separated in two layers in the vial jar was analyzed by gas chromatography with "GC2010Plus," manufactured by SHIMADZU Corporation. The analytical conditions were as follows:
Column: DB-5, manufactured by Agilent Technologies (12 m, 0.2 mm×0.33 μm
Column Temperature: 100° C., heating at 10° C./min, to 280° C. (holding for 10 min)
Injector Temperature: 300° C., detector temperature: 300° C., input amount: 1 μL
The content of the ether groups in the modified cellulose fibers (% by mass) was calculated from a detected amount of the etherification reagent used.

From the ether group content obtained, the molar substitution (MS), amount of moles of substituents based on one mol of the anhydrous glucose unit, was calculated using the following formula (1):

$$MS=(W1/Mw)/((100-W1)/162.14) \quad \text{(Formula 1)}$$

W1: The content of the ether groups in the modified cellulose fibers, % by mass

Mw: The molecular weight of the introduced etherification reagent, g/mol

Test Example 2

Average Fiber Diameters Sizes of Cellulose-Based Raw Material and Modified Cellulose Fibers The fiber diameters of the cellulose-based raw material and the modified cellulose fibers were obtained by the following method. About 0.3 g of an absolutely dried sample was accurately weighed, and stirred in 1.0 L of ion-exchanged water with a household mixer for one minute, to defibriate the fibers in water. Thereafter, 4.0 L of ion-exchanged water was further added, and the mixture was stirred to make it homogeneous. From the aqueous dispersion obtained, about 50 g was collected and accurately weighed as the measurement liquid. The measurement liquid obtained was analyzed by "Kajaani Fiber Lab" manufactured by Metso Automation, to provide an average fiber diameter.

Test Example 3

Average Fiber Diameter of Fine Modified Cellulose Fibers

The dispersion obtained was observed with an optical microscope "Digital Microscope VHX-1000" manufactured by KEYENCE at a magnification of from 300 to 1,000, and calculating an average of 30 or more of fiber strands (calculated by rounding off to a first decimal as a significant digit). In a case where observation with an optical microscope was difficult, a solvent was further added to the cellulose fiber dispersion to provide a 0.0001% by mass dispersion, and the dispersion was dropped on mica and dried to provide an observation sample, and a fiber height of the cellulose fibers in the observation sample was measured with an interatomic force microscope (AFM), Nanoscope III Tapping mode AFM, manufactured by Digital Instrument, the probe Point Probe (NCH) manufactured by NANOSENSORS being used. During the measurements, five or more sets of fine cellulose fibers were extracted from a microscopic image in which the cellulose fibers could be confirmed, and an average fiber diameter, a fiber size in the dispersion, was calculated from those fiber heights. Here, a case where fibers were aggregated in a dispersion to make analysis impossible is listed as ">10,000."

Test Example 4

Confirmation of Crystal Structure

The crystal structure of the modified cellulose fibers was confirmed by measuring with "Rigaku RINT 2500VC X-RAY diffractometer" manufactured by Rigaku Corporation. The measurement conditions were as follows: X-ray source: Cu/Kα-radiation, tube voltage: 40 kV, tube current: 120 mA, measurement range: diffraction angle 2θ=5° to 45°, scanning speed of X-ray: 10°/min. A sample for the measurement was prepared by compressing pellets to a size having an area of 320 mm$^2$ and a thickness of 1 mm. Also, as to the crystallinity of the cellulose I crystal structure, X-ray diffraction intensity was calculated by the following formula (A):

$$\text{Cellulose I Crystallinity (\%)}=[(I22.6-I18.5)/I22.6]\times 100 \quad \text{(A)}$$

wherein I22.6 is a diffraction intensity of a lattice face (002 face)(angle of diffraction 2θ=22.6°), and I18.5 is a diffraction intensity of an amorphous portion (angle of diffraction 2θ=18.5°), in X-ray diffraction.

On the other hand, in a case where a crystallinity obtained by the above formula (A) is 35% or less, it is preferable to use a calculated value based on the formula (B) given below as a crystallinity, in accordance with the description of P199-200 of "*Mokushitsu Kagaku Jikken Manyuaru* (*Wood Science Experimental Manual*)," edited by The Japan Wood Research Society, from the viewpoint of improving the calculation accuracy.

Therefore, in a case where a crystallinity obtained by the above formula (A) is 35% or less, a calculated value based on the following formula (B) can be used as a crystallinity:

$$\text{Cellulose I Crystallinity (\%)}=[Ac/(Ac+Aa)]\times 100 \quad \text{(B)}$$

wherein Ac is a total sum of peak areas of a lattice face (002 face)(angle of diffraction 2θ=22.6°), a lattice face (0-11 face)(angle of diffraction 2θ=15.1°), and a lattice face (0-11 face)(angle of diffraction 2θ=16.2°), Aa is a peak area of an amorphous portion (angle of diffraction 2θ=18.5°, each peak area being calculated by fitting the X-ray diffraction chart obtained to a Gaussian function, in X-ray diffraction.

Test Example 5

Storage Modulus and tan δ

Using a dynamic viscoelastometer "DMS6100," manufactured by SII, the storage modulus and tan δ of a rectangular sample cut out to have a width of 5 mm and a length of 20 mm from the sheet obtained were measured in tensile mode while raising the temperature from −50° C. to 200° C. in a rate of 2° C. per minute in a nitrogen atmosphere at a frequency of 1 Hz. When each value of Comparative Example 1 or 4 is considered as 100, relative modulus and relative tan δ were calculated from the storage modulus and tan δ obtained, and the both values are given in Table 1 and Table 2. It is shown that the higher the value of the relative storage moduli to the corresponding Comparative Example, the more excellent the strength. In addition, it is shown that the lower the value of the relative tan δ to the corresponding Comparative Example, the lower the thermal conversion of energy during the shape transformation and the more excellent the reduced energy loss.

Test Example 6

Coefficient of Linear Thermal Expansion (CTE)

Using a thermal stress-strain measurement apparatus "EXSTAR TMA/SS6100" manufactured by Seiko Instruments, Inc., the measurements were taken with a rectangular sample having a width of 3 mm and a length of 20 mm, which was subjected to temperature elevation at a rate of 5° C. per minute under nitrogen atmosphere in a tensile mode, with applying a load of 50 g. As a coefficient of linear thermal expansion (CTE), a value measured at 80° C. was used. When the CTE of Comparative Example 4 was considered as 100, relative CTE was calculated from the CTE obtained, and the both are shown in Table 2. It is shown that the lower the relative CTE to the CTE of the corresponding Comparative Example, the more excellent the dimensional stability.

TABLE 1

|  |  |  |  |  | Comparative Examples | | Examples | | | | |
|---|---|---|---|---|---|---|---|---|---|---|---|
|  |  |  |  |  | 1 | 31 | 1 | 31 | 32 | 5 | 33 |
| Rubber Composition | Modified Cellulose Fibers | SBR, parts by mass | | | 100 | 100 | 100 | 100 | 100 | 100 | 100 |
|  |  | Substituent | Formula (1) | $R_1$ | — | —$CH_3$ | —$C_4H_9$ | —$C_4H_9$ | —$C_8H_{17}$ | —$C_8H_{17}$ | —$C_{16}H_{33}$ |
|  |  |  |  | Degree of Substitution | — | 0.15 | 0.22 | 0.20 | 0.40 | 0.48 | 0.24 |
|  |  |  | Formula (2) | $R_1$ | — | — | — | — | — | — | — |
|  |  |  |  | n | — | — | — | — | — | — | — |
|  |  |  |  | A | — | — | — | — | — | — | — |
|  |  |  |  | Degree of Substitution | — | — | — | — | — | — | — |
|  |  | Average Fiber Diameter, μm | | | — | 24 | 23 | 24 | 24 | 24 | 23 |
|  |  | Cellulose Crystal Form | | | — | I | I | I | I | I | I |
|  |  | Crystallinity, % | | | — | 57 | 38 | 57 | 51 | 50 | 56 |
|  |  | Raw Material Cellulose | | | | NBKP | Bagasse | NBKP | NBKP | NBKP | NBKP |
|  |  | Parts Added, parts by mass | | | 0 | 10 | 9 | 10 | 10 | 20 | 10 |
|  | Carbon Black, parts by mass | | | | 0 | 0 | 0 | 0 | 0 | 0 | 0 |
|  | Stearic Acid, parts by mass | | | | 2 | 2 | 2 | 2 | 2 | 2 | 2 |
|  | Zinc Oxide, parts by mass | | | | 3 | 3 | 3 | 3 | 3 | 3 | 3 |
|  | Sulfur, parts by mass | | | | 1.5 | 1.5 | 1.5 | 1.5 | 1.5 | 1.5 | 1.5 |
|  | Vulcanization Accelerator TBBS, parts by mass | | | | 0.5 | 0.5 | 0.5 | 0.5 | 0.5 | 0.5 | 0.5 |
|  | Vulcanization Accelerator MBTS, parts by mass | | | | 0.5 | 0.5 | 0.5 | 0.5 | 0.5 | 0.5 | 0.5 |
|  | Vulcanization Accelerator DPG, parts by mass | | | | 0.5 | 0.5 | 0.5 | 0.5 | 0.5 | 0.5 | 0.5 |
| Evaluation Results | 25° C. Relative Storage Modulus, Based on Comparative Example 1 | | | | 100 | 235 | 480 | 510 | 725 | 2,345 | 1,250 |
|  | 25° C. Relative tan δ, Based on Comparative Example 1 | | | | 100 | 101 | 67 | 73 | 68 | 74 | 65 |

TABLE 2

|  |  |  |  |  | Comparative Example | Examples | | |
|---|---|---|---|---|---|---|---|---|
|  |  |  |  |  | 32 | 34 | 35 | 36 |
| Rubber Composition | Modified Cellulose Fibers | SBR, parts by mass | | | 100 | 100 | 100 | 100 |
|  |  | Substituent | Formula (1) | $R_1$ | — | — | — | — |
|  |  |  |  | Degree of Substitution | — | — | — | — |
|  |  |  | Formula (2) | $R_1$ | —$CH_3$ | —$C_4H_9$ | —$C_8H_{17}$ | —$C_{18}H_{17}$ |
|  |  |  |  | n | 0 | 0 | 0 | 0 |
|  |  |  |  | A | — | — | — | — |
|  |  |  |  | Degree of Substitution | 0.35 | 0.57 | 0.10 | 0.30 |
|  |  | Average Fiber Diameter, μm | | | 24 | 24 | 24 | 24 |
|  |  | Cellulose Crystal Form | | | I | I | I | I |
|  |  | Crystallinity, % | | | 55 | 57 | 52 | 55 |
|  |  | Raw Material Cellulose | | | NBKP | NBKP | NBKP | NBKP |
|  |  | Parts Added, parts by mass | | | 10 | 10 | 10 | 10 |
|  | Carbon Black, parts by mass | | | | 0 | 0 | 0 | 0 |
|  | Stearic Acid, parts by mass | | | | 2 | 2 | 2 | 2 |
|  | Zinc Oxide, parts by mass | | | | 3 | 3 | 3 | 3 |
|  | Sulfur, parts by mass | | | | 1.5 | 1.5 | 1.5 | 1.5 |
|  | Vulcanization Accelerator TBBS, parts by mass | | | | 0.5 | 0.5 | 0.5 | 0.5 |
|  | Vulcanization Accelerator MBTS, parts by mass | | | | 0.5 | 0.5 | 0.5 | 0.5 |
|  | Vulcanization Accelerator DPG, parts by mass | | | | 0.5 | 0.5 | 0.5 | 0.5 |
| Evaluation Results | 25° C. Relative Storage Modulus, Based on Comparative Example 1 | | | | 260 | 345 | 1,220 | 1,280 |
|  | 25° C. Relative tan δ, Based on Comparative Example 1 | | | | 105 | 66 | 71 | 64 |

TABLE 3

| | | | | | Comparative Examples | | Examples | | | | | | | |
|---|---|---|---|---|---|---|---|---|---|---|---|---|---|---|
| | | | | | 2 | 3 | 2 | 3 | 4 | 6 | 37 | 38 | 39 | 40 |
| Rubber Composition | | SBR, parts by mass | | | 100 | 100 | 100 | 100 | 100 | 100 | 100 | 100 | 100 | 100 |
| | Modified Cellulose Fibers | Substituent | Formula (1) | $R_1$ | — | — | —$C_4H_9$ | —$C_4H_9$ | —$C_4H_9$ | —$C_8H_{17}$ | —$C_4H_9$ | —$CH_{16}H_{33}$ | — | — |
| | | | | Degree of Substitution | — | — | 0.22 | 0.22 | 0.09 | 0.48 | 0.20 | 0.24 | — | — |
| | | | Formula (2) | $R_1$ | — | — | — | — | — | — | — | — | —$C_4H_9$ | —$C_{18}H_{37}$ |
| | | | | n | — | — | — | — | — | — | — | — | 0 | 0 |
| | | | | A | — | — | — | — | — | — | — | — | — | — |
| | | | | Degree of Substitution | — | — | — | — | — | — | — | — | 0.57 | 0.30 |
| | | Average Fiber Diameter, μm | | | — | 24 | 23 | 23 | 24 | 24 | 24 | 23 | 24 | 24 |
| | | Cellulose Crystal Form | | | — | I | I | I | I | I | I | I | I | I |
| | | Crystallinity, % | | | — | 39 | 38 | 38 | 56 | 50 | 57 | 56 | 57 | 55 |
| | | Raw Material Cellulose | | | — | Bagasse | Bagasse | Bagasse | NBKP | NBKP | NBKP | NBKP | NBKP | NBKP |
| | | Parts Added, parts by mass | | | 0 | 10 | 10 | 20 | 20 | 20 | 10 | 10 | 10 | 10 |
| | | Carbon Black, parts by mass | | | 50 | 50 | 50 | 50 | 50 | 50 | 50 | 50 | 50 | 50 |
| | | Stearic Acid, parts by mass | | | 2 | 2 | 2 | 2 | 2 | 2 | 2 | 2 | 2 | 2 |
| | | Zinc Oxide, parts by mass | | | 3 | 3 | 3 | 3 | 3 | 3 | 3 | 3 | 3 | 3 |
| | | Sulfur, parts by mass | | | 1.5 | 1.5 | 1.5 | 1.5 | 1.5 | 1.5 | 1.5 | 1.5 | 1.5 | 1.5 |
| | | Vulcanization Accelerator TBBS, parts by mass | | | 0.5 | 0.5 | 0.5 | 0.5 | 0.5 | 0.5 | 0.5 | 0.5 | 0.5 | 0.5 |
| | | Vulcanization Accelerator MBTS, parts by mass | | | 0.5 | 0.5 | 0.5 | 0.5 | 0.5 | 0.5 | 0.5 | 0.5 | 0.5 | 0.5 |
| | | Vulcanization Accelerator DPG, parts by mass | | | 0.5 | 0.5 | 0.5 | 0.5 | 0.5 | 0.5 | 0.5 | 0.5 | 0.5 | 0.5 |
| Evaluation Results | | 25° C. Relative Storage Modulus, Based on Comparative Example 1 | | | 795 | 1,585 | 3,605 | 5,525 | 8,650 | 3,130 | 3,920 | 4,420 | 2,555 | 5,890 |
| | | 25° C. Relative tan δ, Based on Comparative Example 1 | | | 82 | 76 | 68 | 66 | 68 | 72 | 73 | 62 | 68 | 65 |

TABLE 4

| | | | | | Comparative Example | Examples | | | | |
|---|---|---|---|---|---|---|---|---|---|---|
| | | | | | 1 | 1 | 41 | 42 | 43 | 44 |
| Rubber Composition | | SBR, parts by mass | | | 100 | 100 | 100 | 100 | 100 | 100 |
| | Modified Cellulose Fibers | Substituent | Formula (1) | $R_1$ | — | —$C_4H_9$ | —$C_4H_9$ | —$C_4H_9$ | —$C_4H_9$ | —$C_4H_9$ |
| | | | | Degree of Substitution | — | 0.22 | 0.26 | 0.35 | 0.30 | 0.28 |
| | | | Formula (2) | $R_1$ | — | — | — | — | — | — |
| | | | | n | — | — | — | — | — | — |
| | | | | A | — | — | — | — | — | — |
| | | | | Degree of Substitution | — | — | — | — | — | — |
| | | Average Fiber Diameter, μm | | | — | 23 | 24 | 28 | 65 | 25 |
| | | Cellulose Crystal Form | | | — | I | I | I | I | I |
| | | Crystallinity, % | | | — | 38 | 60 | 49 | 56 | 35 |
| | | Raw Material Cellulose | | | — | Bagasse | LBKP | HYP | ARBOCEL | Powdery Cellulose A |
| | | Parts Added, parts by mass | | | 0 | 9 | 10 | 10 | 10 | 10 |
| | | Carbon Black, parts by mass | | | 0 | 0 | 0 | 0 | 0 | 0 |
| | | Stearic Acid, parts by mass | | | 2 | 2 | 2 | 2 | 2 | 2 |
| | | Zinc Oxide, parts by mass | | | 3 | 3 | 3 | 3 | 3 | 3 |
| | | Sulfur, parts by mass | | | 1.5 | 1.5 | 1.5 | 1.5 | 1.5 | 1.5 |
| | | Vulcanization Accelerator TBBS, parts by mass | | | 0.5 | 0.5 | 0.5 | 0.5 | 0.5 | 0.5 |
| | | Vulcanization Accelerator MBTS, parts by mass | | | 0.5 | 0.5 | 0.5 | 0.5 | 0.5 | 0.5 |
| | | Vulcanization Accelerator DPG, parts by mass | | | 0.5 | 0.5 | 0.5 | 0.5 | 0.5 | 0.5 |
| Evaluation Results | | 25° C. Relative Storage Modulus, Based on Comparative Example 1 | | | 100 | 480 | 480 | 485 | 405 | 420 |
| | | 25° C. Relative tan δ, Based on Comparative Example 1 | | | 100 | 67 | 70 | 68 | 65 | 65 |

TABLE 5

|  |  |  |  |  | Examples | | | |
|---|---|---|---|---|---|---|---|---|
|  |  |  |  |  | 45 | 46 | 47 | 48 |
| Rubber Composition | Modified Cellulose Fibers | Substituent | Formula (1) | $R_1$ | — | — | — | — |
|  |  |  |  | Degree of Substitution | — | — | — | — |
|  |  |  | Formula (2) | $R_1$ | $-C_{18}H_{37}$ | $-C_{18}H_{37}$ | $-C_{18}H_{37}$ | $-C_{18}H_{37}$ |
|  |  |  |  | n | 0 | 0 | 0 | 0 |
|  |  |  |  | A | — | — | — | — |
|  |  |  |  | Degree of Substitution | 0.30 | 0.30 | 0.30 | 0.30 |
|  |  | Average Fiber Diameter, μm | | | 24 | 24 | 24 | 24 |
|  |  | Cellulose Crystal Form | | | I | I | I | I |
|  |  | Crystallinity, % | | | 55 | 55 | 55 | 55 |
|  |  | Raw Material Cellulose | | | NBKP | NBKP | NBKP | NBKP |
|  |  | Pretreatment Before Mixing | | | Vibrating Mill, Without Water | Vibrating Mill, Water, 50 parts by mass | None | None |
|  |  | Parts Added, parts by mass | | | 10 | 10 | 10 | 10 |
|  | Carbon Black, parts by mass | | | | 0 | 0 | 0 | 0 |
|  | Stearic Acid, parts by mass | | | | 2 | 2 | 2 | 2 |
|  | Zinc Oxide, parts by mass | | | | 3 | 3 | 3 | 3 |
|  | Sulfur, parts by mass | | | | 1.5 | 1.5 | 1.5 | 1.5 |
|  | Vulcanization Accelerator TBBS, parts by mass | | | | 0.5 | 0.5 | 0.5 | 0.5 |
|  | Vulcanization Accelerator MBTS, parts by mass | | | | 0.5 | 0.5 | 0.5 | 0.5 |
|  | Vulcanization Accelerator DPG, parts by mass | | | | 0.5 | 0.5 | 0.5 | 0.5 |
|  | Silane Coupling Agent, parts by mass | | | | 0 | 0 | 0 | 2 |
|  | Presence or Absence of Kneading Step C | | | | Absence | Absence | Presence | Absence |
| Evaluation Results | 25° C. Relative Storage Modulus, Based on Comparative Example 1 | | | | 1,090 | 1,450 | 1,420 | 1,335 |
|  | 25° C. Relative tan δ, Based on Comparative Example 1 | | | | 65 | 72 | 71 | 66 |

TABLE 6

|  |  |  |  |  | Comparative Example | Examples | | | | | |
|---|---|---|---|---|---|---|---|---|---|---|---|
|  |  |  |  |  | 4 | 10 | 49 | 11 | 50 | 51 | 52 |
| Rubber Composition | Modified Cellulose Fibers | Substituent | Formula (1) | $R_1$ | — | $-C_{16}H_{33}$ | $-C_{16}H_{33}$ | — | $-C_8H_{17}$ | $-C_8H_{17}$ | — |
|  |  |  |  | Degree of Substitution | — | 0.03 | 0.24 | — | 0.40 | 0.22 | — |
|  |  |  | Formula (2) | $R_1$ | — | — | — | $C_8H_{17}$ | — | — | $C_{18}H_{37}$ |
|  |  |  |  | n | — | — | — | 0 | — | — | 0 |
|  |  |  |  | A | — | — | — | — | — | — | — |
|  |  |  |  | Degree of Substitution | — | — | — | 0.02 | — | — | 0.30 |
|  |  | Average Fiber Diameter, nm | | | — | 120 | 78 | 110 | 61 | 112 | 81 |
|  |  | Cellulose Crystal Form | | | — | I | I | I | I | I | I |
|  |  | Crystallinity, % | | | — | 51 | 56 | 56 | 51 | 56 | 55 |
|  |  | Raw Material Cellulose | | | — | NBKP | NBKP | NBKP | NBKP | MFC | NBKP |
|  |  | Parts Added, parts by mass | | | 0 | 10 | 10 | 10 | 10 | 10 | 10 |
|  | Carbon Black, parts by mass | | | | 0 | 0 | 0 | 0 | 0 | 0 | 0 |
|  | Stearic Acid, parts by mass | | | | 2 | 2 | 2 | 2 | 2 | 2 | 2 |
|  | Zinc Oxide, parts by mass | | | | 3 | 3 | 3 | 3 | 3 | 3 | 3 |
|  | Sulfur, parts by mass | | | | 1.5 | 1.5 | 1.5 | 1.5 | 1.5 | 1.5 | 1.5 |
|  | Vulcanization Accelerator TBBS, parts by mass | | | | 0.5 | 0.5 | 0.5 | 0.5 | 0.5 | 0.5 | 0.5 |
|  | Vulcanization Accelerator MBTS, parts by mass | | | | 0.5 | 0.5 | 0.5 | 0.5 | 0.5 | 0.5 | 0.5 |
|  | Vulcanization Accelerator DPG, parts by mass | | | | 0.5 | 0.5 | 0.5 | 0.5 | 0.5 | 0.5 | 0.5 |
| Evaluation Results | 80° C. Relative Storage Modulus, Based on Comparative Example 4 | | | | 100 | 8,545 | 11,056 | 3,545 | 5,221 | 2,603 | 9,084 |
|  | 80° C. Relative CTE, Based on Comparative Example 4 | | | | 100 | 20 | 20 | 21 | 20 | 28 | 21 |

It can be seen from Tables 1 to 6 that the rubber compositions of the present invention contain specified modified cellulose fibers, so that the rubber compositions are excellent in high mechanical strength, reduced energy loss, and dimensional stability.

INDUSTRIAL APPLICABILITY

The rubber compositions of the present invention can be suitably used as machine tool parts, household electric appliance parts, automobile parts, and the like.

The invention claimed is:

1. A method for producing a rubber composition comprising a rubber and fibrillated modified cellulose fibers, comprising introducing one or more compounds selected from the group consisting of nonionic alkylene oxide compounds having a total number of carbon atoms of 5 or more and 32 or less per molecule and nonionic glycidyl ether compounds having a total number of carbon atoms of 5 or more and 100 or less per molecule to an unfibrillated cellulose-based raw material having an average fiber diameter of 5 μm or more via an ether bond, in the presence of a base, to provide modified cellulose fibers, fibrillating the resulting modified cellulose fibers, and mixing the fibrillated modified cellulose fibers obtained and the rubber, wherein the modified cellulose fibers have an average fiber diameter of 5 μm or more.

2. The method for producing a rubber composition according to claim 1, wherein the base is one or more members selected from the group consisting of alkali metal hydroxides, alkaline earth metal hydroxides, primary to tertiary amines, quaternary ammonium salts, imidazoles and derivatives thereof, pyridine and derivatives thereof, and alkoxides.

3. The method for producing a rubber composition according to claim 1, wherein the amount of the base is 0.01 equivalents or more and 10 equivalents or less, based on the anhydrous glucose unit in the cellulose-based raw material.

4. The method for producing a rubber composition according to claim 1, wherein the nonionic alkylene oxide compound is a compound represented by the following general formula (1A):

(1A)

wherein $R_1$ is a linear or branched alkyl group having 4 or more carbon atoms and 30 or less carbon atoms, and wherein the nonionic glycidyl ether compound is a compound represented by the following general formula (2A):

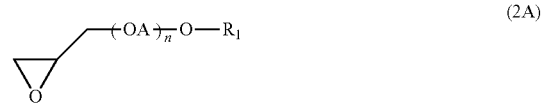

(2A)

wherein $R_1$ is a linear or branched alkyl group having 4 or more carbon atoms and 30 or less carbon atoms; A is a linear or branched, divalent saturated hydrocarbon group having 1 or more carbon atoms and 6 or less carbon atoms; and n is a number of 0 or more and 50 or less.

5. The method for producing a rubber composition according to claim 1, wherein the modified cellulose fibers obtained are finely fibrillated.

6. The method for producing a rubber composition according to claim 1, wherein the modified cellulose fibers obtained have a state in which one or more substituents selected from the group consisting of substituents represented by the following general formula (1) and substituents represented by the following general formula (2):

(1)

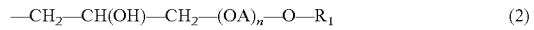

(2)

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms are bonded to cellulose fibers via an ether bond, wherein the modified cellulose fibers have a cellulose I crystal structure.

7. The method for producing a rubber composition according to claim 6, wherein the introduction ratio of the substituent or substituents selected from the group consisting of substituents represented by the general formula (1) and substituents represented by the general formula (2) is 0.001 mol or more and 1.5 mol or less, per mol of the anhydrous glucose unit.

8. The method for producing a rubber composition according to claim 6, wherein n is a number of 0 or more and 20 or less, and A is a linear or branched, divalent saturated hydrocarbon group having 2 or more carbon atoms and 3 or less carbon atoms, in the substituent represented by the general formula (2).

9. The method for producing a rubber composition according to claim 6, wherein $R_1$ in the general formula (1) has the number of carbon atoms of 4 or more and 20 or less.

10. The method for producing a rubber composition according to claim 6, wherein $R_1$ in the general formula (2) has the number of carbon atoms of 4 or more and 20 or less.

11. The method for producing a rubber composition according to claim 6, wherein A in the general formula (2) has the number of carbon atoms of 2 or more and 4 or less.

12. The method for producing a rubber composition according to claim 6, wherein the introduction ratio of the substituent or substituents selected from the group consisting of substituents represented by the general formula (1) and substituents represented by the general formula (2) is 0.01 mol or more, per mol of the anhydrous glucose unit.

13. The method for producing a rubber composition according to claim 1, wherein the content of the modified cellulose fibers is 1 part by mass or more and 30 parts by mass or less, based on 100 parts by mass of the rubber.

14. The method for producing a rubber composition according to claim 1, wherein the crystallinity of the modified cellulose fibers is 20% or more.

15. A method for producing a rubber composition comprising a rubber and fibrillated modified cellulose fibers, comprising
introducing one or more compounds selected from the group consisting of nonionic alkylene oxide compounds having a total number of carbon atoms of 5 or more and 32 or less per molecule and nonionic glycidyl ether compounds having a total number of carbon atoms of 5 or more and 100 or less per molecule to an unfibrillated cellulose-based raw material having an average fiber diameter of 5 μm or more via an ether bond, in the presence of a base, to provide modified cellulose fibers,
fibrillating the resulting modified cellulose fibers, and
mixing the fibrillated modified cellulose fibers obtained and the rubber,
wherein the modified cellulose fibers obtained have a state in which one or more substituents selected from the group consisting of substituents represented by the following general formula (1) and substituents represented by the following general formula (2):

—CH$_2$—CH(OH)—R$_1$      (1)

—CH$_2$—CH(OH)—CH$_2$—(OA)$_n$—O—R$_1$      (2)

wherein each R$_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms
are bonded to cellulose fibers via an ether bond, wherein the modified cellulose fibers have a cellulose I crystal structure,
wherein the modified cellulose fibers are modified cellulose fibers represented by the following general formula (3):

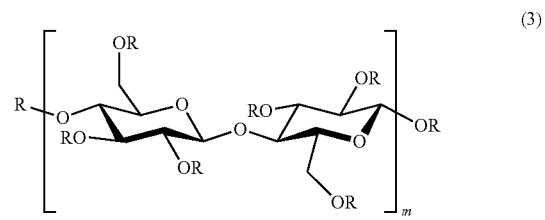
(3)

wherein R, which may be identical or different, is hydrogen, or a substituent selected from the group consisting of substituents represented by the general formula (1) defined above and substituents represented by the general formula (2) defined above; and m is an integer of 20 or more and 3,000 or less, with proviso that a case where all R's are simultaneously hydrogens is excluded.

16. The method for producing a rubber composition according to claim 15, wherein the modified cellulose fibers obtained are finely fibrillated.

17. The method for producing a rubber composition according to claim 16, wherein the modified cellulose fibers have an average fiber diameter of 1 nm or more and 500 nm or less.

18. The method for producing a rubber composition according to claim 16, wherein the modified cellulose fibers have an average fiber diameter of 3 nm or more and 300 nm or less.

19. A method for producing a rubber composition comprising a rubber and fibrillated modified cellulose fibers, comprising
introducing one or more compounds selected from the group consisting of nonionic alkylene oxide compounds having a total number of carbon atoms of 5 or more and 32 or less per molecule and nonionic glycidyl ether compounds having a total number of carbon atoms of 5 or more and 100 or less per molecule to an unfibrillated cellulose-based raw material having an average fiber diameter of 5 μm or more via an ether bond, in the presence of a base, to provide modified cellulose fibers,
fibrillating the resulting modified cellulose fibers, and
mixing the fibrillated modified cellulose fibers obtained and the rubber,
wherein the modified cellulose fibers have an average fiber diameter of 10 μm or more and 100 μm or less.

* * * * *